(12) United States Patent
Petersen

(10) Patent No.: US 11,543,613 B2
(45) Date of Patent: Jan. 3, 2023

(54) FIBER OPTIC CABLE WITH FLEXIBLE CONDUIT

(71) Applicant: CommScope Technologies LLC, Hickory, NC (US)

(72) Inventor: Cyle D. Petersen, Belle Plaine, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/725,078

(22) Filed: Dec. 23, 2019

(65) Prior Publication Data

US 2020/0241231 A1 Jul. 30, 2020

Related U.S. Application Data

(62) Division of application No. 16/105,747, filed on Aug. 20, 2018, now Pat. No. 10,514,520, which is a (Continued)

(51) Int. Cl.
*G02B 6/44* (2006.01)
*G02B 6/00* (2006.01)

(52) U.S. Cl.
CPC ......... *G02B 6/4478* (2013.01); *G02B 6/4472* (2013.01); *G02B 6/4452* (2013.01); (Continued)

(58) Field of Classification Search
CPC ....... G02B 6/4478; G02B 6/4472; G02B 6/00 (Continued)

(56) References Cited

U.S. PATENT DOCUMENTS 4,299,244 A * 11/1981 Hirai ...................... A61B 1/123
134/102.1
4,351,579 A * 9/1982 Kordes ................ H01R 12/775
439/497
(Continued)

FOREIGN PATENT DOCUMENTS

AT 408 698 B 2/2002
CN 1289930 C 12/2006
(Continued)

OTHER PUBLICATIONS

Extended Search Report and Written Opinion for EP Patent Application 17767658.2, dated Jul. 23, 2019, 8 pages.
(Continued)

*Primary Examiner* — Kaveh C Kianni
(74) *Attorney, Agent, or Firm* — Merchant & Gould P.C.

(57) ABSTRACT

The present disclosure relates to a fiber optic cable that includes a plurality of internal optical fibers and a fiber optic cable portion. The fiber optic cable portion includes an outer jacket and an inner conduit, the inner conduit containing the plurality of optical fibers disposed therein. The fiber optic cable further includes a flexible conduit portion, wherein the flexible conduit portion has a proximal end and a distal end. The proximal end is secured to the fiber optic cable portion and the distal end has a terminating device. The terminating device at least partially encases the flexible conduit portion, and the plurality of optical fibers passes through the flexible conduit portion and the terminating device.

18 Claims, 34 Drawing Sheets

Related U.S. Application Data division of application No. 14/918,764, filed on Oct. 21, 2015, now Pat. No. 10,054,753.

(60) Provisional application No. 62/091,108, filed on Dec. 12, 2014, provisional application No. 62/082,479, filed on Nov. 20, 2014, provisional application No. 62/072,842, filed on Oct. 30, 2014, provisional application No. 62/069,158, filed on Oct. 27, 2014.

(52) U.S. Cl.
CPC .......... *G02B 6/4461* (2013.01); *G02B 6/4476* (2013.01); *G02B 6/4494* (2013.01)

(58) Field of Classification Search
USPC ....................................................... 385/100
See application file for complete search history.

(56) References Cited

U.S. PATENT DOCUMENTS

| | | | | |
|---|---|---|---|---|
| 4,435,612 A | | 3/1984 | Smith | |
| 4,441,786 A | | 4/1984 | Hulin et al. | |
| 4,453,291 A | * | 6/1984 | Fidrych | G02B 6/4465 24/115 N |
| 4,461,529 A | * | 7/1984 | Fariss | H01R 13/562 439/604 |
| 4,582,067 A | * | 4/1986 | Silverstein | A61B 1/015 600/455 |
| 4,650,933 A | | 3/1987 | Benda et al. | |
| 4,682,411 A | | 8/1987 | Weber et al. | |
| 4,684,211 A | | 8/1987 | Weber et al. | |
| 4,768,961 A | | 9/1988 | Lau | |
| 4,770,639 A | | 9/1988 | Lau | |
| 4,775,121 A | * | 10/1988 | Carty | F16L 3/2235 248/68.1 |
| 4,791,245 A | * | 12/1988 | Thornley | H01R 4/72 174/73.1 |
| 4,797,114 A | | 1/1989 | Lau | |
| 4,820,200 A | | 4/1989 | Lau | |
| 4,840,568 A | | 6/1989 | Burroughs et al. | |
| 4,917,491 A | | 4/1990 | Ring et al. | |
| 5,083,346 A | * | 1/1992 | Orton | F16B 2/08 24/16 PB |
| 5,133,583 A | | 7/1992 | Wagman et al. | |
| 5,135,265 A | * | 8/1992 | Bouscher | F16L 39/04 138/112 |
| 5,146,532 A | | 9/1992 | Hodge | |
| 5,189,410 A | | 2/1993 | Kosugi et al. | |
| 5,199,878 A | | 4/1993 | Dewey et al. | |
| 5,214,673 A | | 5/1993 | Morgenstern et al. | |
| 5,231,688 A | | 7/1993 | Zimmer | |
| 5,317,663 A | | 5/1994 | Beard et al. | |
| 5,339,379 A | | 8/1994 | Kutsch et al. | |
| 5,363,465 A | | 11/1994 | Korkowski et al. | |
| 5,364,389 A | * | 11/1994 | Anderson | A61B 17/11 606/8 |
| 5,381,501 A | | 1/1995 | Cardinal et al. | |
| 5,393,249 A | | 2/1995 | Morgenstern et al. | |
| 5,416,874 A | * | 5/1995 | Giebel | G02B 6/3897 174/23 R |
| 5,432,875 A | | 7/1995 | Korkowski et al. | |
| 5,467,062 A | | 11/1995 | Burroughs | |
| 5,473,718 A | | 12/1995 | Sommer | |
| 5,497,444 A | | 3/1996 | Wheeler | |
| 5,514,128 A | * | 5/1996 | Hillsman | A61B 18/245 600/585 |
| 5,554,026 A | * | 9/1996 | Van Hale | A61C 1/052 433/132 |
| 5,582,525 A | | 12/1996 | Louwagie et al. | |
| 5,598,500 A | | 1/1997 | Crespel | |
| 5,613,030 A | | 3/1997 | Hoffer et al. | |
| 5,627,925 A | | 5/1997 | Alferness et al. | |
| 5,645,519 A | * | 7/1997 | Lee | A61B 1/2676 600/114 |
| 5,649,042 A | * | 7/1997 | Saito | G02B 6/443 385/102 |
| 5,685,741 A | | 11/1997 | Dewey et al. | |
| 5,694,511 A | | 12/1997 | Pimpinella et al. | |
| 5,701,380 A | | 12/1997 | Larson et al. | |
| 5,717,810 A | | 2/1998 | Wheeler | |
| 5,754,725 A | | 5/1998 | Kuder et al. | |
| 5,838,861 A | * | 11/1998 | Bunde | G02B 6/3878 385/100 |
| 5,863,083 A | * | 1/1999 | Giebel | G02B 6/3897 254/134.3 FT |
| 5,879,075 A | * | 3/1999 | Conner | F21V 21/28 362/138 |
| 5,915,055 A | | 6/1999 | Bennett et al. | |
| 5,946,440 A | | 8/1999 | Puetz | |
| 5,970,195 A | | 10/1999 | Brown | |
| 6,072,932 A | | 6/2000 | Bennett et al. | |
| 6,104,855 A | | 8/2000 | Jeon | |
| 6,116,961 A | | 9/2000 | Henneberger et al. | |
| 6,208,796 B1 | | 3/2001 | Vigliaturo | |
| 6,226,111 B1 | | 5/2001 | Chang et al. | |
| 6,259,851 B1 | | 7/2001 | Daoud | |
| 6,263,136 B1 | | 7/2001 | Jennings et al. | |
| 6,278,831 B1 | | 8/2001 | Henderson et al. | |
| 6,307,998 B2 | | 10/2001 | Vigliaturo | |
| 6,328,608 B1 | | 12/2001 | Olson et al. | |
| 6,363,183 B1 | | 3/2002 | Koh | |
| 6,363,198 B1 | | 3/2002 | Braga et al. | |
| 6,370,294 B1 | | 4/2002 | Pfeiffer et al. | |
| 6,389,214 B1 | | 5/2002 | Smith et al. | |
| 6,418,262 B1 | | 7/2002 | Puetz et al. | |
| 6,421,493 B1 | | 7/2002 | Burek et al. | |
| 6,424,781 B1 | | 7/2002 | Puetz et al. | |
| 6,511,330 B1 | | 1/2003 | Norris | |
| 6,532,332 B2 | | 3/2003 | Solheid et al. | |
| 6,535,682 B1 | | 3/2003 | Puetz et al. | |
| 6,554,652 B1 | | 4/2003 | Musolf et al. | |
| 6,556,738 B2 | | 4/2003 | Pfeiffer et al. | |
| 6,556,763 B1 | | 4/2003 | Puetz et al. | |
| 6,571,048 B1 | | 5/2003 | Bechamps et al. | |
| 6,579,014 B2 | | 6/2003 | Melton et al. | |
| 6,591,051 B2 | | 7/2003 | Solheid et al. | |
| 6,599,024 B2 | | 7/2003 | Zimmel | |
| 6,614,953 B2 | | 9/2003 | Strasser et al. | |
| 6,614,979 B2 | | 9/2003 | Bourdeau | |
| 6,616,459 B2 | | 9/2003 | Norris | |
| 6,623,173 B1 | | 9/2003 | Grois et al. | |
| 6,632,106 B2 | | 10/2003 | Musolf et al. | |
| RE38,311 E | | 11/2003 | Wheeler | |
| 6,647,197 B1 | | 11/2003 | Marrs et al. | |
| 6,655,848 B2 | | 12/2003 | Simmons et al. | |
| 6,668,108 B1 | | 12/2003 | Helkey et al. | |
| 6,669,627 B1 | * | 12/2003 | Campbell | A61N 5/0618 600/27 |
| 6,688,780 B2 | | 2/2004 | Duran | |
| 6,719,382 B2 | | 4/2004 | Sucharczuk et al. | |
| 6,738,555 B1 | | 5/2004 | Cooke et al. | |
| 6,760,531 B1 | | 7/2004 | Solheid et al. | |
| 6,761,594 B2 | | 7/2004 | Johnsen et al. | |
| 6,810,193 B1 | | 10/2004 | Muller | |
| 6,814,620 B1 | * | 11/2004 | Wu | H01R 13/514 439/225 |
| 6,822,874 B1 | | 11/2004 | Marler | |
| 6,824,312 B2 | | 11/2004 | McClellan et al. | |
| 6,830,465 B2 | | 12/2004 | Norris et al. | |
| 6,832,035 B1 | | 12/2004 | Daoud et al. | |
| 6,848,952 B2 | | 2/2005 | Norris | |
| 6,850,685 B2 | | 2/2005 | Tinucci et al. | |
| 6,863,446 B2 | | 3/2005 | Ngo | |
| 6,867,668 B1 | * | 3/2005 | Dagostino | H01L 23/66 257/E23.065 |
| 6,873,772 B2 | | 3/2005 | Nakaya | |
| 6,885,798 B2 | | 4/2005 | Zimmel | |
| 6,890,187 B2 | | 5/2005 | Norris | |
| 6,909,828 B2 | | 6/2005 | Zimmel et al. | |
| 6,937,807 B2 | | 8/2005 | Franklin et al. | |

(56) References Cited

U.S. PATENT DOCUMENTS

| | | | |
|---|---|---|---|
| 6,983,095 B2 | 1/2006 | Reagan et al. | |
| 6,993,237 B2 | 1/2006 | Cooke et al. | |
| 7,029,322 B2 | 4/2006 | Ernst et al. | |
| 7,035,510 B2 | 4/2006 | Zimmel et al. | |
| 7,118,284 B2 | 10/2006 | Nakajima et al. | |
| 7,121,732 B2 | 10/2006 | Pimpinella et al. | |
| 7,142,764 B2 | 11/2006 | Allen et al. | |
| 7,190,874 B1 | 3/2007 | Barth et al. | |
| 7,194,181 B2 | 3/2007 | Holmberg et al. | |
| 7,218,827 B2 | 5/2007 | Vongseng et al. | |
| 7,221,832 B2 | 5/2007 | Tinucci | |
| 7,228,047 B1* | 6/2007 | Szilagyi | G02B 6/3878 385/134 |
| 7,233,731 B2 | 6/2007 | Solheid et al. | |
| 7,269,319 B2 | 9/2007 | Zimmel | |
| 7,270,485 B1 | 9/2007 | Robinson et al. | |
| 7,277,614 B2 | 10/2007 | Cody et al. | |
| 7,280,725 B2 | 10/2007 | Brown et al. | |
| 7,303,220 B2 | 12/2007 | Zellak | |
| 7,310,474 B2 | 12/2007 | Kanaski et al. | |
| 7,333,606 B1 | 2/2008 | Swam et al. | |
| 7,346,254 B2 | 3/2008 | Kramer et al. | |
| 7,349,616 B1 | 3/2008 | Castonguay et al. | |
| 7,376,322 B2 | 5/2008 | Zimmel et al. | |
| 7,376,323 B2 | 5/2008 | Zimmel | |
| 7,400,813 B2 | 7/2008 | Zimmel | |
| 7,418,181 B2 | 8/2008 | Zimmel et al. | |
| 7,418,186 B1 | 8/2008 | Grubish et al. | |
| 7,440,669 B2 | 10/2008 | Tinucci | |
| 7,453,706 B2 | 11/2008 | Clark et al. | |
| 7,470,068 B2 | 12/2008 | Kahle et al. | |
| 7,485,806 B1* | 2/2009 | Gretz | H02G 3/0666 174/135 |
| 7,495,931 B2 | 2/2009 | Clark et al. | |
| 7,499,622 B2 | 3/2009 | Castonguay et al. | |
| 7,606,459 B2 | 10/2009 | Zimmel et al. | |
| 7,636,507 B2 | 12/2009 | Lu et al. | |
| 7,641,396 B2 | 1/2010 | Feldner | |
| 7,664,363 B1 | 2/2010 | Mowery, Sr. | |
| 7,711,236 B2 | 5/2010 | Gonzalez et al. | |
| 7,738,759 B2 | 6/2010 | Parikh et al. | |
| 7,748,911 B2 | 7/2010 | Keenum et al. | |
| 7,853,112 B2 | 12/2010 | Zimmel et al. | |
| 7,885,505 B2 | 2/2011 | Zimmel | |
| 7,912,336 B2 | 3/2011 | Zimmel | |
| 7,933,484 B2 | 4/2011 | Hetzer et al. | |
| 8,081,857 B2 | 12/2011 | Nair et al. | |
| 8,172,465 B2 | 5/2012 | Kleeberger | |
| 8,290,333 B2 | 10/2012 | Barlowe et al. | |
| 8,346,045 B2 | 1/2013 | Zimmel et al. | |
| 8,380,036 B2 | 2/2013 | Smith et al. | |
| 8,573,855 B2 | 11/2013 | Nhep | |
| 8,577,199 B2* | 11/2013 | Pierce | G02B 6/4465 385/136 |
| 8,620,130 B2* | 12/2013 | Cooke | G02B 6/4465 385/138 |
| 8,705,930 B2* | 4/2014 | Lu | G02B 6/3878 385/137 |
| 8,737,786 B1* | 5/2014 | Compton | G02B 6/4472 385/100 |
| 8,798,428 B2 | 8/2014 | Zimmel et al. | |
| 8,824,841 B1* | 9/2014 | Mullen | G02B 6/32 385/35 |
| 8,824,850 B2 | 9/2014 | Garcia et al. | |
| 9,140,872 B2 | 9/2015 | Sedor et al. | |
| 9,151,923 B2 | 10/2015 | Nielson et al. | |
| 9,395,509 B2 | 7/2016 | Petersen et al. | |
| 10,054,753 B2 | 8/2018 | Petersen et al. | |
| 10,514,520 B2 | 12/2019 | Petersen | |
| 10,564,363 B1* | 2/2020 | Corl | G02B 6/3803 |
| 10,914,909 B2 | 2/2021 | Wentworth et al. | |
| 2002/0037193 A1* | 3/2002 | Gibbons | H02G 3/30 403/344 |
| 2002/0062978 A1 | 5/2002 | Sakabe et al. | |
| 2002/0131750 A1 | 9/2002 | Holman et al. | |
| 2002/0141724 A1 | 10/2002 | Ogawa et al. | |
| 2002/0181896 A1 | 12/2002 | McClellan et al. | |
| 2003/0031423 A1 | 2/2003 | Zimmel | |
| 2003/0031437 A1 | 2/2003 | Simmons et al. | |
| 2003/0081916 A1 | 5/2003 | Norris | |
| 2003/0122040 A1* | 7/2003 | Pisczak | G02B 6/483 248/74.1 |
| 2003/0132685 A1 | 7/2003 | Sucharczuk et al. | |
| 2003/0134541 A1 | 7/2003 | Johnsen et al. | |
| 2003/0147597 A1 | 8/2003 | Duran | |
| 2003/0169974 A1 | 9/2003 | Ngo | |
| 2003/0185535 A1 | 10/2003 | Tinucci et al. | |
| 2003/0202765 A1 | 10/2003 | Franklin et al. | |
| 2003/0210875 A1 | 11/2003 | Wagner et al. | |
| 2004/0094605 A1* | 5/2004 | Wild | H01R 9/05 228/175 |
| 2004/0126069 A1 | 7/2004 | Jong et al. | |
| 2004/0141707 A1 | 7/2004 | Mozolowski | |
| 2004/0156609 A1 | 8/2004 | Lanier et al. | |
| 2004/0161970 A1* | 8/2004 | Wlos | H01R 9/0518 439/578 |
| 2004/0184748 A1* | 9/2004 | Clatanoff | G02B 6/4436 385/113 |
| 2004/0240826 A1 | 12/2004 | Daoud et al. | |
| 2004/0266273 A1* | 12/2004 | Wu | H01R 13/6587 439/701 |
| 2005/0002633 A1 | 1/2005 | Solheid et al. | |
| 2005/0003707 A1* | 1/2005 | Wu | H01R 13/6658 439/579 |
| 2005/0041926 A1 | 2/2005 | Elkins, II et al. | |
| 2005/0053341 A1 | 3/2005 | Zimmel | |
| 2005/0058402 A1 | 3/2005 | Ernst et al. | |
| 2005/0067847 A1 | 3/2005 | Zellak | |
| 2005/0105873 A1 | 5/2005 | Reagan et al. | |
| 2005/0105879 A1 | 5/2005 | Kanasaki et al. | |
| 2005/0111811 A1* | 5/2005 | Cooke | G02B 6/4465 385/136 |
| 2005/0167147 A1 | 8/2005 | Marsac et al. | |
| 2005/0232550 A1 | 10/2005 | Nakajima et al. | |
| 2005/0232551 A1 | 10/2005 | Chang et al. | |
| 2005/0232565 A1 | 10/2005 | Heggestad et al. | |
| 2005/0265668 A1 | 12/2005 | Martin | |
| 2005/0281526 A1 | 12/2005 | Vongseng et al. | |
| 2006/0083468 A1 | 4/2006 | Kahle et al. | |
| 2006/0093301 A1 | 5/2006 | Zimmel et al. | |
| 2006/0120672 A1* | 6/2006 | Cody | G02B 6/4472 385/86 |
| 2006/0153516 A1 | 7/2006 | Napiorkowski et al. | |
| 2006/0169469 A1* | 8/2006 | Eastwood | H02G 1/085 174/19 |
| 2006/0188210 A1 | 8/2006 | Zimmel | |
| 2006/0233508 A1 | 10/2006 | Mann et al. | |
| 2006/0269192 A1 | 11/2006 | Hayasaka | |
| 2006/0269198 A1 | 11/2006 | Blazer et al. | |
| 2006/0269205 A1 | 11/2006 | Zimmel | |
| 2006/0269206 A1 | 11/2006 | Zimmel | |
| 2006/0285807 A1 | 12/2006 | Lu et al. | |
| 2007/0036503 A1 | 2/2007 | Solheid et al. | |
| 2007/0047893 A1 | 3/2007 | Kramer et al. | |
| 2007/0117437 A1* | 5/2007 | Boehnlein | A61B 1/05 439/210 |
| 2007/0147765 A1 | 6/2007 | Gniadek et al. | |
| 2007/0172172 A1 | 7/2007 | Theuerkorn et al. | |
| 2007/0189692 A1 | 8/2007 | Zimmel et al. | |
| 2007/0212004 A1 | 9/2007 | Lu et al. | |
| 2008/0026647 A1* | 1/2008 | Boehnlein | H01R 13/5205 439/882 |
| 2008/0063351 A1 | 3/2008 | Elkins et al. | |
| 2008/0124039 A1 | 5/2008 | Gniadek et al. | |
| 2008/0138020 A1 | 6/2008 | Robinson et al. | |
| 2008/0138026 A1* | 6/2008 | Yow | G02B 6/4471 385/137 |
| 2008/0164059 A1* | 7/2008 | Cipolla | H02G 3/22 174/360 |
| 2008/0175541 A1 | 7/2008 | Lu et al. | |
| 2008/0248673 A1* | 10/2008 | Boehnlein | A61B 1/00052 439/320 |

(56) References Cited

U.S. PATENT DOCUMENTS

| | | |
|---|---|---|
| 2008/0253730 A1 | 10/2008 | Cox et al. |
| 2008/0317415 A1 | 12/2008 | Hendrickson et al. |
| 2009/0002689 A1* | 1/2009 | Cobb, III ............... G01M 11/33 356/73.1 |
| 2009/0022468 A1 | 1/2009 | Zimmel |
| 2009/0022469 A1 | 1/2009 | Zimmel et al. |
| 2009/0035987 A1 | 2/2009 | Daly et al. |
| 2009/0060421 A1* | 3/2009 | Parikh ................. G02B 6/4442 385/71 |
| 2009/0067804 A1 | 3/2009 | Knorr et al. |
| 2009/0103881 A1 | 4/2009 | Gonzalez et al. |
| 2009/0116806 A1 | 5/2009 | Zimmel et al. |
| 2009/0196553 A1 | 8/2009 | Anderson et al. |
| 2010/0027942 A1 | 2/2010 | Smith et al. |
| 2010/0030033 A1* | 2/2010 | Farley ..................... A61B 1/07 600/249 |
| 2010/0054860 A1* | 3/2010 | Thompson ............. G01V 1/201 405/166 |
| 2010/0059229 A1* | 3/2010 | Smith ................... E21B 43/013 166/346 |
| 2010/0086260 A1 | 4/2010 | Parikh et al. |
| 2010/0092136 A1 | 4/2010 | Nhep |
| 2010/0150504 A1* | 6/2010 | Allen ................... G02B 6/4475 385/76 |
| 2010/0158464 A1 | 6/2010 | Zimmel et al. |
| 2010/0215331 A1 | 8/2010 | Gonzalez et al. |
| 2010/0266244 A1 | 10/2010 | Lu et al. |
| 2011/0024103 A1* | 2/2011 | Storm, Jr. ............. E21B 17/206 166/65.1 |
| 2011/0081121 A1* | 4/2011 | Le Dissez ............ G02B 6/4475 385/102 |
| 2011/0164853 A1 | 7/2011 | Corbille et al. |
| 2011/0182558 A1 | 7/2011 | Garcia et al. |
| 2011/0229098 A1* | 9/2011 | Abernathy ........... G02B 6/4433 385/102 |
| 2011/0257563 A1* | 10/2011 | Thapliyal ............... A61N 7/022 606/27 |
| 2011/0262084 A1* | 10/2011 | Ott ....................... G02B 6/4471 385/96 |
| 2011/0284285 A1* | 11/2011 | Miura ..................... H02G 3/32 174/70 R |
| 2011/0317975 A1 | 12/2011 | Lu et al. |
| 2012/0008909 A1 | 1/2012 | Mertesdorf et al. |
| 2012/0045178 A1 | 2/2012 | Theuerkorn |
| 2012/0186845 A1* | 7/2012 | Eshima ................... H02G 3/03 174/15.6 |
| 2012/0230636 A1 | 9/2012 | Blockley et al. |
| 2012/0301090 A1 | 11/2012 | Cline et al. |
| 2012/0328253 A1 | 12/2012 | Hurley |
| 2013/0011105 A1 | 1/2013 | Barlowe et al. |
| 2013/0077928 A1 | 3/2013 | Hsing |
| 2013/0114937 A1 | 5/2013 | Zimmel et al. |
| 2013/0183012 A1 | 7/2013 | Cabanne Lopez et al. |
| 2013/0209042 A1 | 8/2013 | Belenky et al. |
| 2013/0209043 A1 | 8/2013 | Norris et al. |
| 2013/0294735 A1* | 11/2013 | Burris ................... G02B 6/4471 385/101 |
| 2013/0330967 A1* | 12/2013 | Youtsey ................. H01R 9/0518 439/584 |
| 2014/0083229 A1* | 3/2014 | Kume ................... B25J 19/0025 74/490.02 |
| 2014/0093217 A1 | 4/2014 | Lu et al. |
| 2014/0126873 A1* | 5/2014 | Cooke ................... G02B 6/4471 385/139 |
| 2014/0133823 A1* | 5/2014 | Simmons ............. H02G 15/007 385/137 |
| 2014/0140664 A1* | 5/2014 | Islam ................... G02B 6/4471 385/86 |
| 2014/0140671 A1 | 5/2014 | Islam |
| 2014/0219621 A1* | 8/2014 | Barnette, Jr. ........ G02B 6/4472 385/135 |
| 2014/0233903 A1 | 8/2014 | Valderrabano |
| 2014/0241674 A1* | 8/2014 | Isenhour ............... G02B 6/4284 385/93 |
| 2014/0248798 A1* | 9/2014 | Youtsey ................. H01R 9/0524 439/584 |
| 2015/0078720 A1* | 3/2015 | Sedor ................... G02B 6/4472 385/137 |
| 2015/0110442 A1 | 4/2015 | Zimmel et al. |
| 2015/0155697 A1* | 6/2015 | Loveless ............... H02G 15/076 174/50.6 |
| 2015/0168657 A1 | 6/2015 | Islam |
| 2015/0226927 A1* | 8/2015 | Islam ................... G02B 6/4416 385/101 |
| 2015/0260936 A1* | 9/2015 | Newbury .................. G02B 6/46 385/135 |
| 2015/0284036 A1* | 10/2015 | Miles ................. B62D 33/0273 292/337 |
| 2015/0370029 A1 | 12/2015 | Petersen et al. |
| 2016/0004016 A1 | 1/2016 | Zimmel et al. |
| 2016/0139355 A1 | 5/2016 | Petersen |
| 2016/0178850 A1 | 6/2016 | Nhep |
| 2016/0363733 A1* | 12/2016 | Nielson ................. G02B 6/4471 |
| 2017/0102506 A1 | 4/2017 | Newbury et al. |
| 2017/0269319 A1 | 6/2017 | Miller |
| 2017/0212313 A1 | 7/2017 | Elenabaas et al. |
| 2018/0149823 A1 | 5/2018 | Wang et al. |
| 2018/0196211 A1 | 7/2018 | Agata et al. |
| 2019/0004272 A1 | 1/2019 | Field |
| 2019/0056562 A1 | 2/2019 | Petersen |
| 2021/0141186 A1 | 5/2021 | Wentworth et al. |

FOREIGN PATENT DOCUMENTS

| | | |
|---|---|---|
| CN | 101866034 A | 10/2010 |
| CN | 202013442 U | 10/2011 |
| CN | 202600223 U | 12/2012 |
| CN | 203909358 U | 10/2014 |
| DE | 41 30 706 A1 | 3/1993 |
| DE | 44 05 459 A1 | 8/1995 |
| DE | 202 01 170 U1 | 5/2002 |
| DE | 102 07 337 A1 | 11/2002 |
| DE | 10 2004 019 085 | 11/2005 |
| DE | 10200401905 A1 | 11/2005 |
| DE | 20 2006 006 016 U1 | 8/2006 |
| DE | 10 2007 009 223 A1 | 8/2008 |
| EP | 0 202 994 A1 | 11/1986 |
| EP | 0339791 A1 | 11/1989 |
| EP | 0 355 639 A2 | 2/1990 |
| EP | 0 490 698 A1 | 6/1992 |
| EP | 0 646 811 A2 | 4/1995 |
| EP | 0 730 177 A2 | 9/1996 |
| EP | 0 828 356 A2 | 3/1998 |
| EP | 1 092 996 A2 | 4/2001 |
| EP | 1 107 031 A1 | 6/2001 |
| EP | 1 179 745 A2 | 2/2002 |
| EP | 1 473 578 A2 | 11/2004 |
| EP | 1 589 361 A1 | 10/2005 |
| GB | 1129287 A | 10/1968 |
| GB | 2 215 084 A | 9/1989 |
| GB | 2 300 978 A | 11/1996 |
| JP | H01-317824 A | 12/1989 |
| JP | 2002-333547 A | 11/2002 |
| JP | 2003-98379 A | 4/2003 |
| WO | 96/36896 A1 | 11/1996 |
| WO | 00/75706 A2 | 12/2000 |
| WO | 02/39170 A2 | 5/2002 |
| WO | 02/099528 A1 | 12/2002 |
| WO | 02/103429 A2 | 12/2002 |
| WO | 03/093889 A1 | 11/2003 |
| WO | 2006/127397 A1 | 11/2006 |
| WO | 2008059212 A1 | 5/2008 |
| WO | 2010/042507 A1 | 4/2010 |
| WO | 2015/200321 A1 | 12/2015 |
| WO | 2015/200327 A1 | 12/2015 |
| WO | 2016/110245 A1 | 7/2016 |
| WO | 2016/123092 A1 | 8/2016 |
| WO | 2017/020076 A1 | 2/2017 |

(56)    References Cited

FOREIGN PATENT DOCUMENTS

| WO | 2017/161310 A1 | 9/2017 |
| WO | 2018/044729 A1 | 3/2018 |
| WO | 2018/208518 A1 | 11/2018 |

OTHER PUBLICATIONS

Exhibit A: Fanout product by ADC Telecommunications, Inc., 2 pages, admitted as prior art as of Oct. 13, 2016.
Exhibit B: Fanout Product by ADC Telecommunications, Inc., 5 pages, admitted as prior art as of Oct. 13, 2016.
Exhibit C: Fanout Product by ADC Telecommunications, Inc., 7 pages, admitted as prior art as of Oct. 13, 2016.
24 Fiber Transition Housing by ADC Telecommunications, Inc., 2 pages, admitted as prior art as of Jun. 25, 2010.
U.S. Appl. No. 62/082,429, filed Nov. 20, 2014 entitled "Fiber Optic Cable with Flexible Conduit".

\* cited by examiner

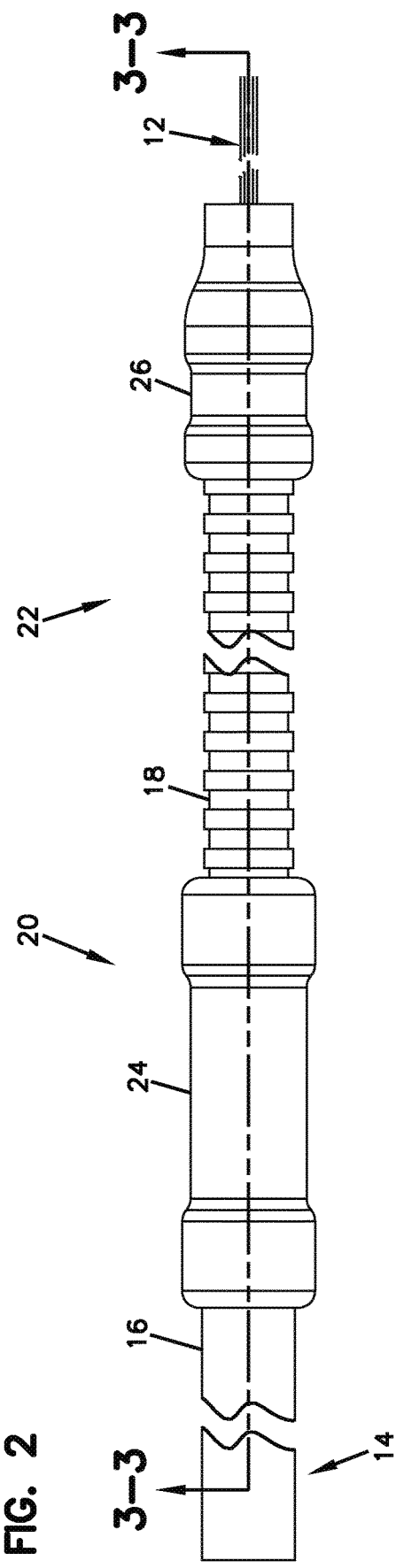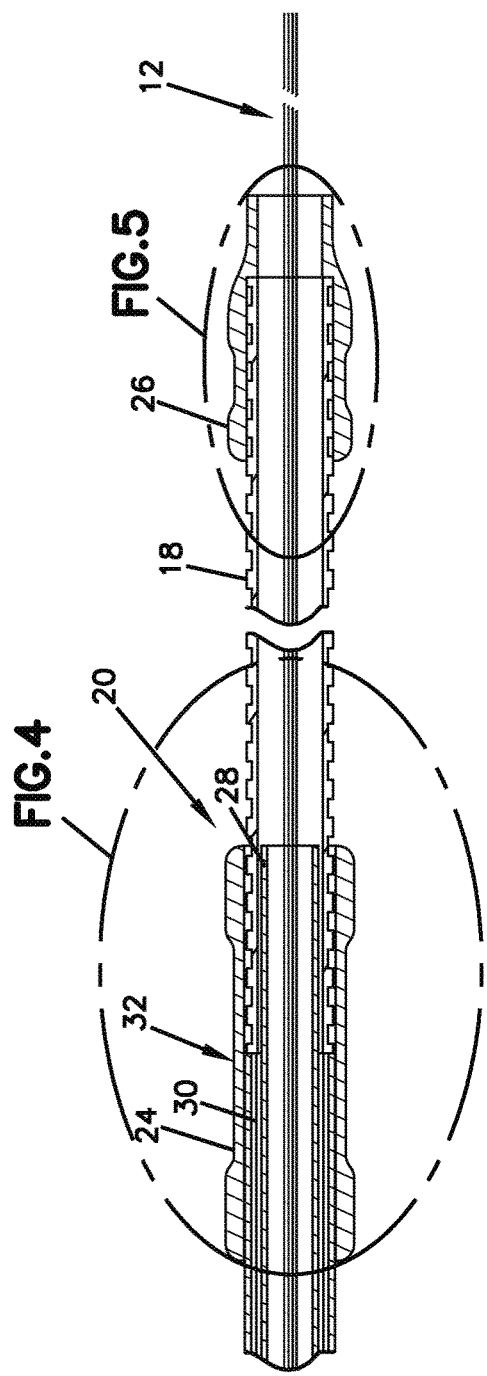

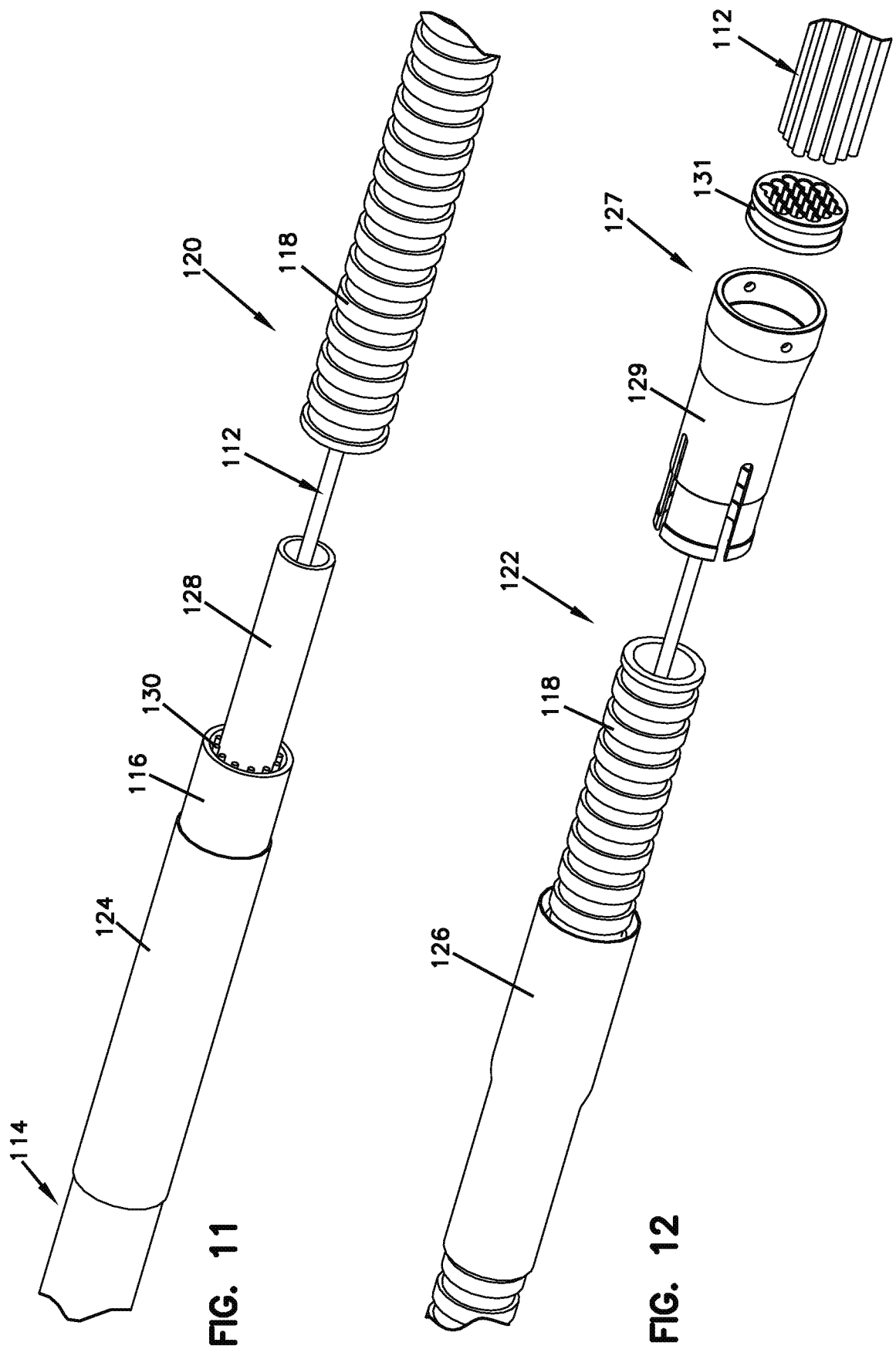

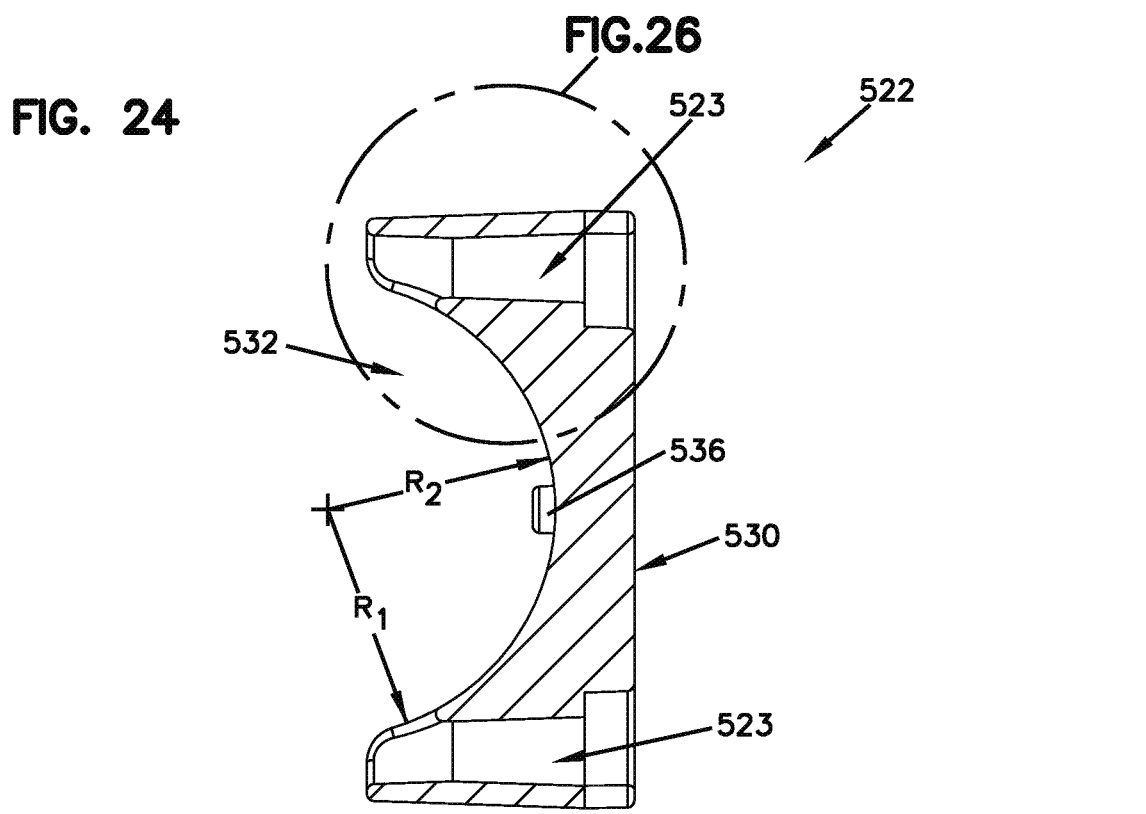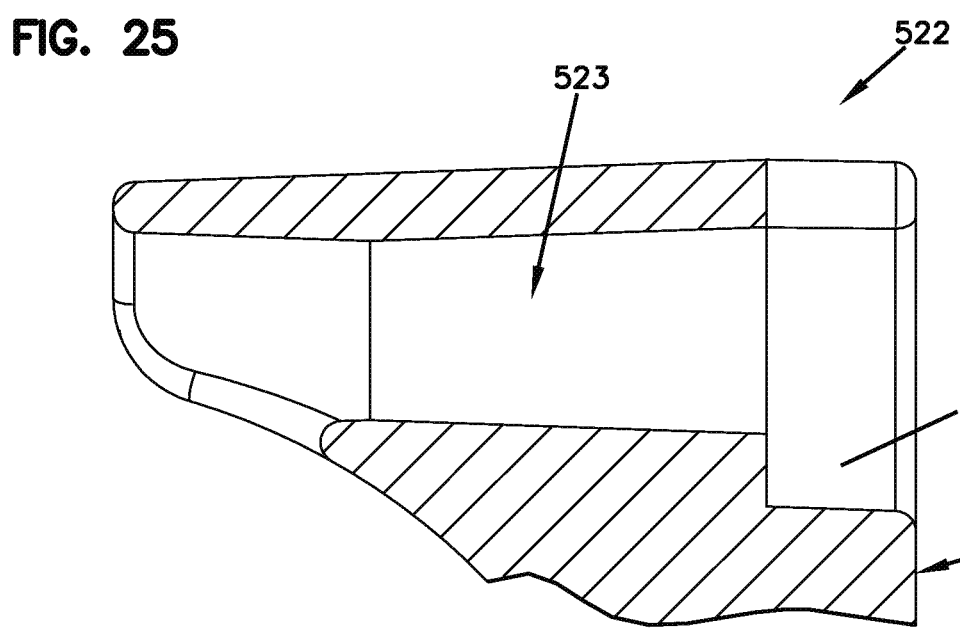

FIBER OPTIC CABLE WITH FLEXIBLE CONDUIT

CROSS REFERENCE TO RELATED APPLICATIONS

This application is a divisional of application Ser. No. 16/105,747, filed Aug. 20, 2018, now U.S. Pat. No. 10,514,520. application Ser. No. 16/105,747 is a divisional of application Ser. No. 14/918,764, filed Oct. 21, 2015, now issued as U.S. Pat. No. 10,054,753, which application claims the benefit of provisional application Serial Nos. 62/091,108, filed Dec. 12, 2014; 62/082,479, filed Nov. 20, 2014; 62/072,842, filed Oct. 30, 2014; and 62/069,158, filed Oct. 27, 2014, which applications are incorporated herein by reference in their entirety. A claim of priority, to the extent appropriate is made to each of above-referenced applications.

TECHNICAL FIELD

The present disclosure relates generally to telecommunications equipment. More particularly, the present disclosure relates to fiber optic cabling and the method of making thereof.

BACKGROUND

Telecommunications equipment containing optical fibers is known. Fiber optic cables that carry a plurality of optical fibers over distances to connect to equipment are also known. Some cables, such as trunk cables, are often configured to have a low flexibility. Because of the low flexibility, it is often difficult to maneuver the cables around tight bends and within small places. This becomes a problem when attempting to connect the cables to telecommunications equipment. Because of this, there is a need for a system, method and device to improve the flexibility of the cables, specifically near the end that connects to telecommunications equipment.

SUMMARY

One aspect of the present disclosure relates to a fiber optic cable that includes a plurality of internal optical fibers and a fiber optic cable portion. The fiber optic cable portion includes an outer jacket and an inner conduit, the inner conduit containing the plurality of optical fibers disposed therein. The fiber optic cable further includes a flexible conduit portion, wherein the flexible conduit portion has a proximal end and a distal end. The proximal end is secured to the fiber optic cable portion and the distal end has a terminating device. The terminating device at least partially encases the flexible conduit portion, and the plurality of optical fibers passes through the flexible conduit portion and the terminating device.

Another aspect of the present disclosure relates to a method of making a fiber optic cable. The method includes providing a fiber optic cable that has an inner conduit and an outer jacket. The inner conduit contains a plurality of optical fibers. The method further includes providing a flexible conduit that has proximal and distal ends, and stripping a portion of the outer jacket from the fiber optic cable to expose a portion of inner conduit. The method further includes securing the proximal end of the flexible conduit to the exposed portion of the inner conduit of the fiber optic cable, thereby creating a junction. The method further includes securing a coupling device to the flexible conduit and to the outer jacket of the fiber optic cable, the securing mechanism encasing the junction. The method further includes securing a terminating device to the distal end of the flexible conduit, the terminating device being configured to allow for passage of the plurality of optical fibers therethrough.

Various claims are disclosed for connecting the flexible conduit to fiber optic equipment.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 2 illustrates a schematic side view of the fiber optic cable shown in FIG. 1;

FIG. 3 illustrates a cross-sectional view along line 3-3 of the fiber optic cable shown in FIG. 2;

FIG. 11 illustrates an exploded perspective view of a portion of a fiber optic cable, according to one embodiment of the present disclosure;

FIG. 12 illustrates an exploded perspective view of a portion of a fiber optic cable, according to one embodiment of the present disclosure;

FIG. 24 illustrates a cross-sectional view along line A-A of the clamp half shown in FIG. 20; and FIG. 25 illustrates an enlarged cross-sectional view of a portion of the clamp half shown in FIG. 20.

FIG. 30 illustrates a perspective view of a clamp according to one embodiment of the present disclosure;

DETAILED DESCRIPTION

Figure 1:
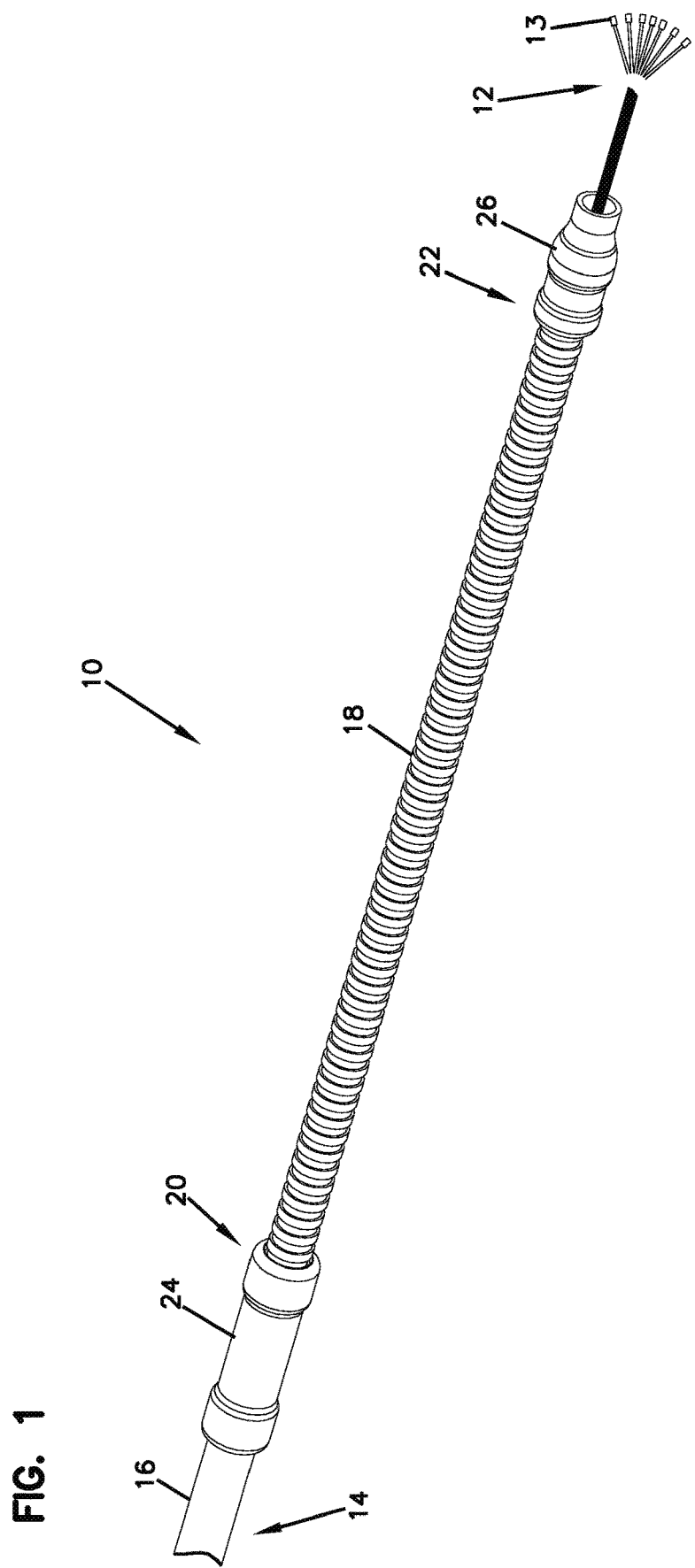
FIG. 1 illustrates a perspective view of a fiber optic cable, according to one embodiment of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The present disclosure describes, generally, a fiber optic cable, such as a trunk cable, that has a robust construction and can include many optical fibers. Typically such cables provide sufficient optical fiber protection, but are relatively stiff. The fiber optic cable can have an increased flexibility at an end that connects to telecommunications equipment. The increased flexibility of the cable allows for improved ease of use during installation. Additionally, protection of the internal components of the cable (e.g. the optical fibers) has not been compromised.

FIG. 1 is a perspective view of a fiber optic cable 10. FIG. 2 is a schematic side view of the fiber optic cable 10 in FIG. 1. The fiber optic cable 10 can include a plurality of optical fibers 12 disposed therein. In some embodiments, the optical fibers 12 can be part of a ribbon cable. In other embodiments, the optical fibers 12 can be loose within the cable 10. In other embodiments, the optical fibers 12 can each have a fiber optic connector 13 attached to the end. The fiber optic connectors 13 can be configured to interface with like connector-receiving devices, such as fiber optic adapters. The fiber optic cable 10 can further include a trunk cable portion 14. The trunk cable portion 14 can have an outer jacket 16. The fiber optic cable 10 can also have a flexible conduit portion 18. In some embodiments, the flexible conduit portion 18 can be made of plastic. In other embodiments, the flexible conduit portion 18 can be made of a metal (e.g. aluminum and steel).

The flexible conduit portion 18 should have a crush-proof construction so as to properly protect the optical fibers 12 located within the conduit. In some embodiments, the flexible conduit portion 18 may be clamped to another surface during installation, creating the need to have a crush-proof construction of the flexible conduit portion 18. The flexible conduit portion 18 has a proximal end 20 and a distal end 22. The proximal end 20 can be adjacent an end of the trunk cable portion 14 of the fiber optic cable 10. The proximal end 20 of the flexible conduit portion 18 can be secured to the trunk cable portion 14 by a coupling device 24. The distal end 22 of the flexible conduit portion 18 can have a terminating device 26 through which the optical fibers 12 pass through. In some embodiments, the distal end 22 can be configured to interface with telecommunications equipment.

The flexible conduit portion 18 includes a tubular construction. In one embodiment, the tubular construction is substantially closed in a 360-degree surrounding of the internal optical fibers. In one embodiment, the tubular construction is continuous in cross-section along the full length of flexible conduit portion 18. The tubular construction can have corrugations or other shapes to allow for flexibility and fiber protection from bending excessively or kinking.

FIG. 3 is a cross-sectional view along the line 3-3 in FIG. 2. The coupling device 24, as shown, can be connected to the outer jacket 16 of the trunk cable portion 14 and to the flexible conduit portion 18, thereby enclosing a junction 32 created by the flexible conduit portion 18 and the trunk cable portion 14. In the depicted embodiment, the coupling device 24 can be constructed of an overmold. In some embodiments the overmold may be constructed from plastics such as urethanes and thermoplastic elastomers (TPE), and hard plastics such as nylon and polycarbonate. Near the distal end 22 of the flexible conduit portion 18, the terminating device 26 can be disposed over the end of the flexible conduit portion 18 to enclose the end of the flexible conduit portion 18. This configuration can be advantageous because the terminating device 26 can protect the plurality of optical fibers 12 from damage originating from any sharp edges on the end of the flexible conduit portion 18. In some embodiments, the terminating device 26 may be an overmold constructed from the same material as the coupling device 24.

In some embodiments, the trunk cable portion 14 can also include an inner conduit 28. The inner conduit 28 can be disposed within the outer jacket 16 of the cable. The inner conduit 28 can also be constructed of a like material as the outer jacket 16. In still other embodiments, the trunk cable portion 14 can include a plurality of strength members 30 disposed between the outer jacket 16 and the inner conduit 28. The strength members 30 can be constructed of aramid yarn in some embodiments. The strength members 30 can help to provide tensile strength to the trunk cable. The strength members 30 can be held by the overmold of the coupling device 24 and/or the flexible conduit portion 18. In the depicted embodiment, at the junction 32, the flexible conduit portion 18 can be sized so as to be disposed over a portion of the inner conduit 28. The inner conduit 28 then can terminate generally near the proximal end 20 of the flexible conduit portion 18. In some embodiments, the inner conduit 28 terminates at the junction 32, encased by the coupling device 24. In some embodiments, the portion of the flexible conduit portion 18 between the proximal end 20 and the distal end 22 will only contain the plurality of optical fibers. Near the distal end 22, the flexible conduit portion 18 can be enclosed by the terminating device 26, the plurality of optical fibers 12 passing therethrough.

Figure 4:
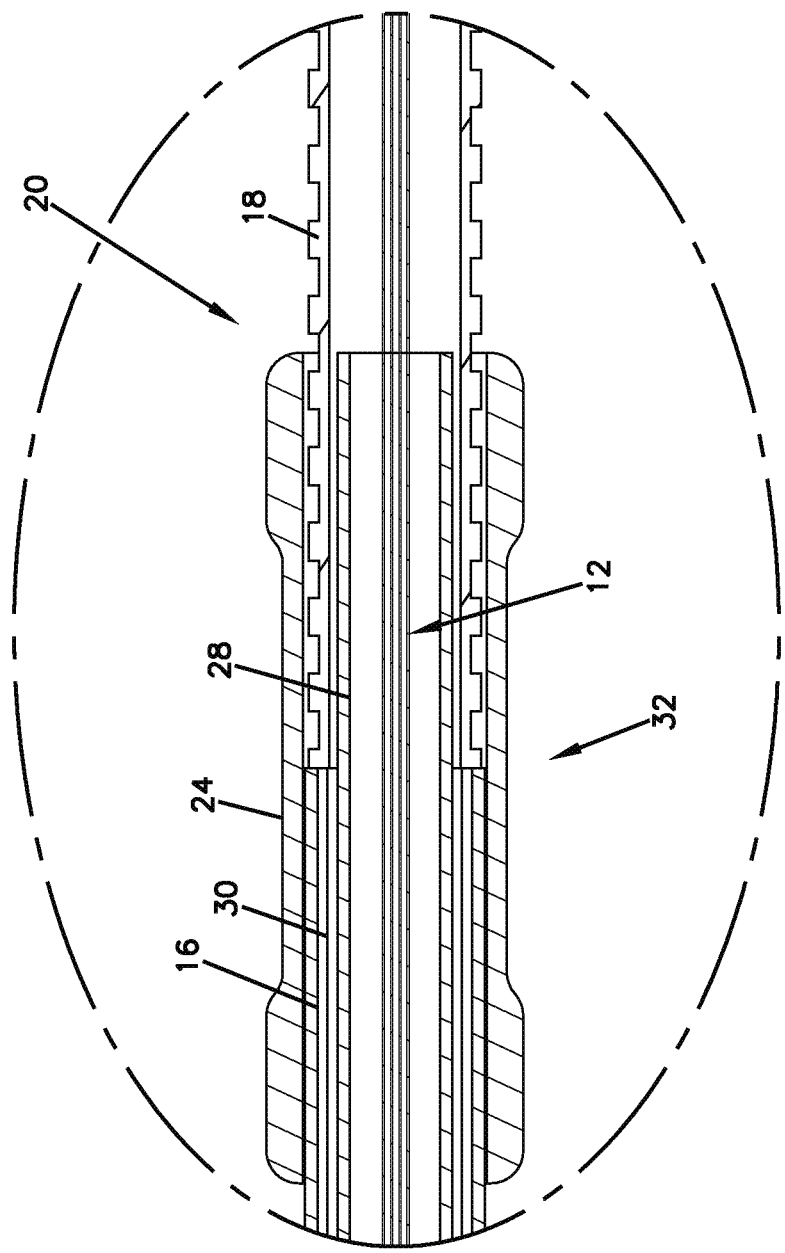
FIG. 4 illustrates an enlarged cross-sectional view of a portion of the fiber optic cable shown in FIG. 3.

FIG. 4 is a closer view of a portion of the fiber optic cable 10 as shown in FIG. 3. The coupling device 24 can encase the entire junction 32. In some embodiments, the coupling device 24 may be secured to the outer jacket 16 and/or the flexible conduit portion 18 by way of an adhesive or epoxy to prevent the loosening of the junction 32 during the manipulation of the fiber optic cable 10. In other embodiments, the proximal end 20 of the flexible conduit portion 18 may be secured to the inner conduit 28 of the trunk cable portion 14 by way of an epoxy.

Figure 5:
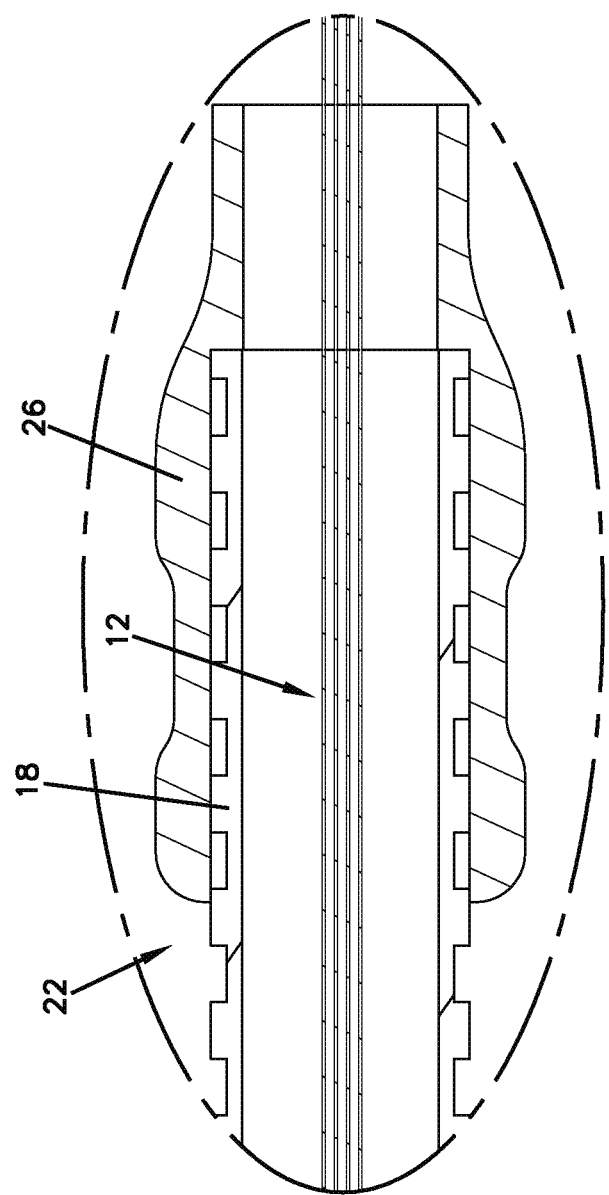
FIG. 5 illustrates an enlarged cross-sectional view of a portion of the fiber optic cable shown in FIG. 3.

FIG. 5 is a closer view of a portion of the fiber optic cable 10 as shown in FIG. 3. The terminating device 26 can be secured to the flexible conduit portion 18 by an adhesive.

Figure 6:
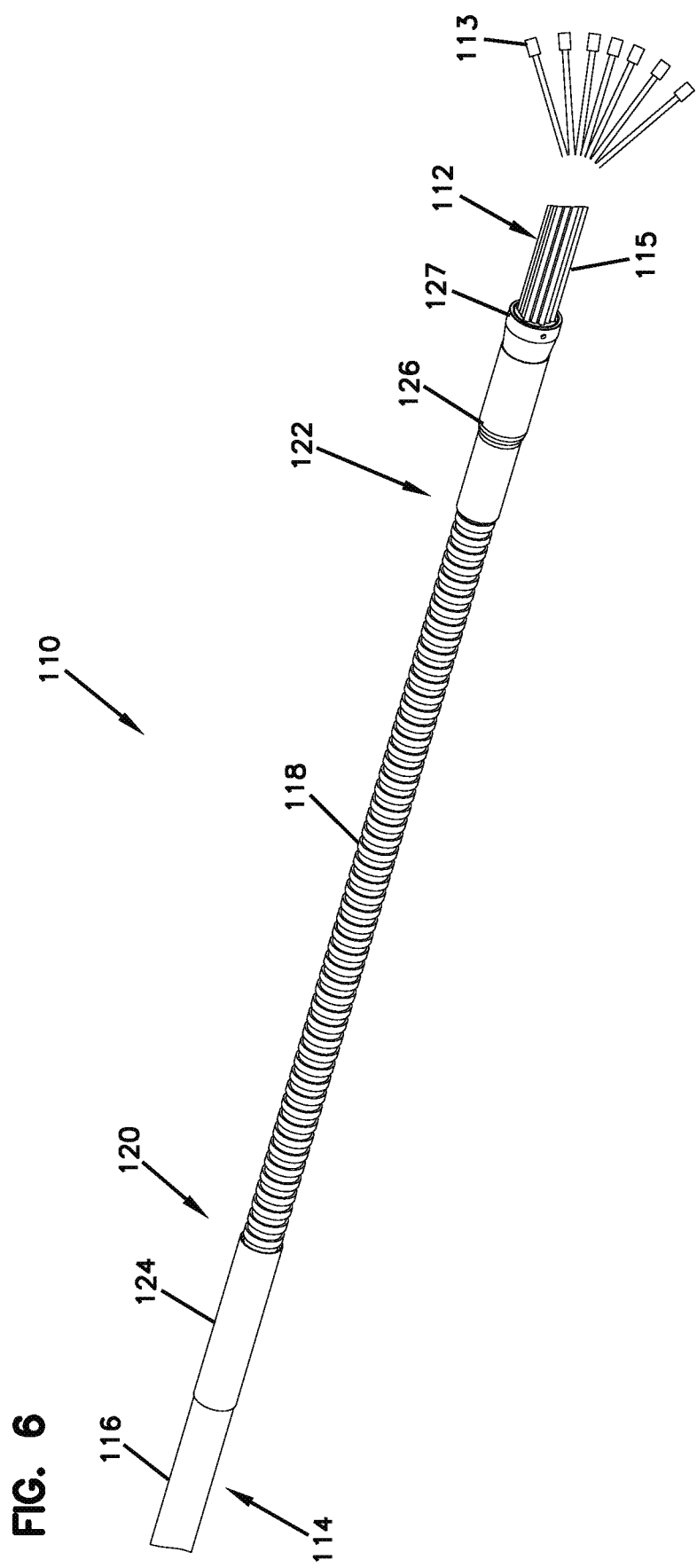
FIG. 6 illustrates a perspective view of a fiber optic cable, according to one embodiment of the present disclosure.
Figure 7:
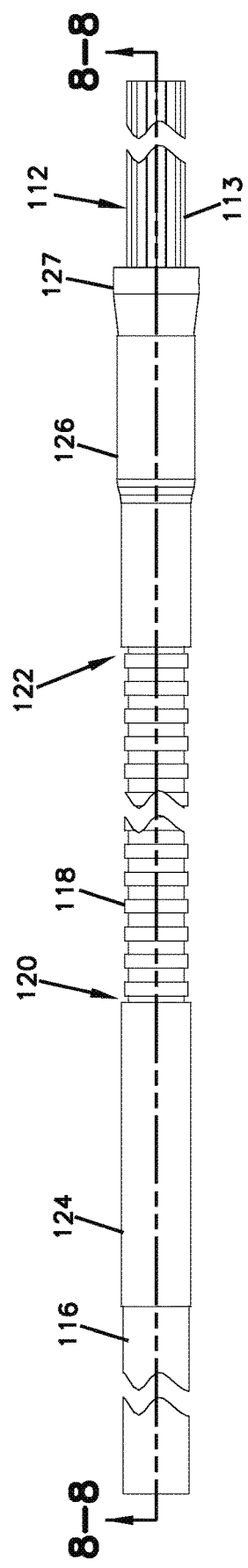
FIG. 7 illustrates a schematic side view of the fiber optic cable shown in FIG. 6.

FIG. 6 is a perspective view of a fiber optic cable 110 according to one embodiment of the present disclosure. FIG. 7 is a side view of the fiber optic cable 110 in FIG. 6. The fiber optic cable 110 can have a similar construction to the fiber optic cable 10 as shown in FIGS. 1-5. The fiber optic cable 110 can have a plurality of optical fibers 112 disposed within the cable, each fiber can have a fiber optic connector 113 attached to the end. In addition, the fiber optic cable 110 can have a trunk cable portion 114, a flexible conduit portion 118, a coupling device 124, and a terminating device 126. The trunk cable 114 can have an outer jacket 116, and the flexible conduit portion 118 can have a proximal end 120 and a distal end 122. The terminating device 126 can further include a fan-out device 127. The fan-out device 127 can be configured to separate each optical fiber 112, or groups of fibers 112, each fiber having their own furcation tube 115 for protection.

Figure 8:
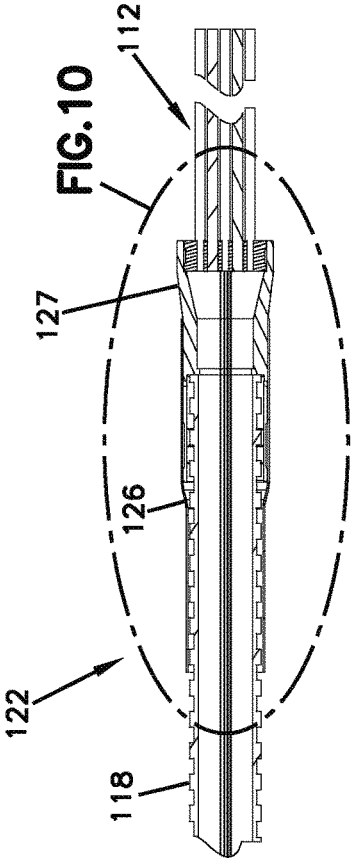
FIG. 8 illustrates a cross-sectional view along line 8-8 of the fiber optic cable shown in FIG. 7.

FIG. 8 is a cross-sectional view along the line 8-8 in FIG. 7. The coupling device 124 that encloses a junction 132 in the depicted embodiment can be heat shrink tubing. In some embodiments, the heat shrink tubing can also include an adhesive. The terminating device 126 can be heat shrink tubing configured to enclose and seal the flexible conduit portion 118 and the fan-out device 127 together. Similar to the fiber optic cable 10, the trunk cable portion 114 can include in inner conduit 128 that can be configured to terminate near the junction 132.

Figure 9:
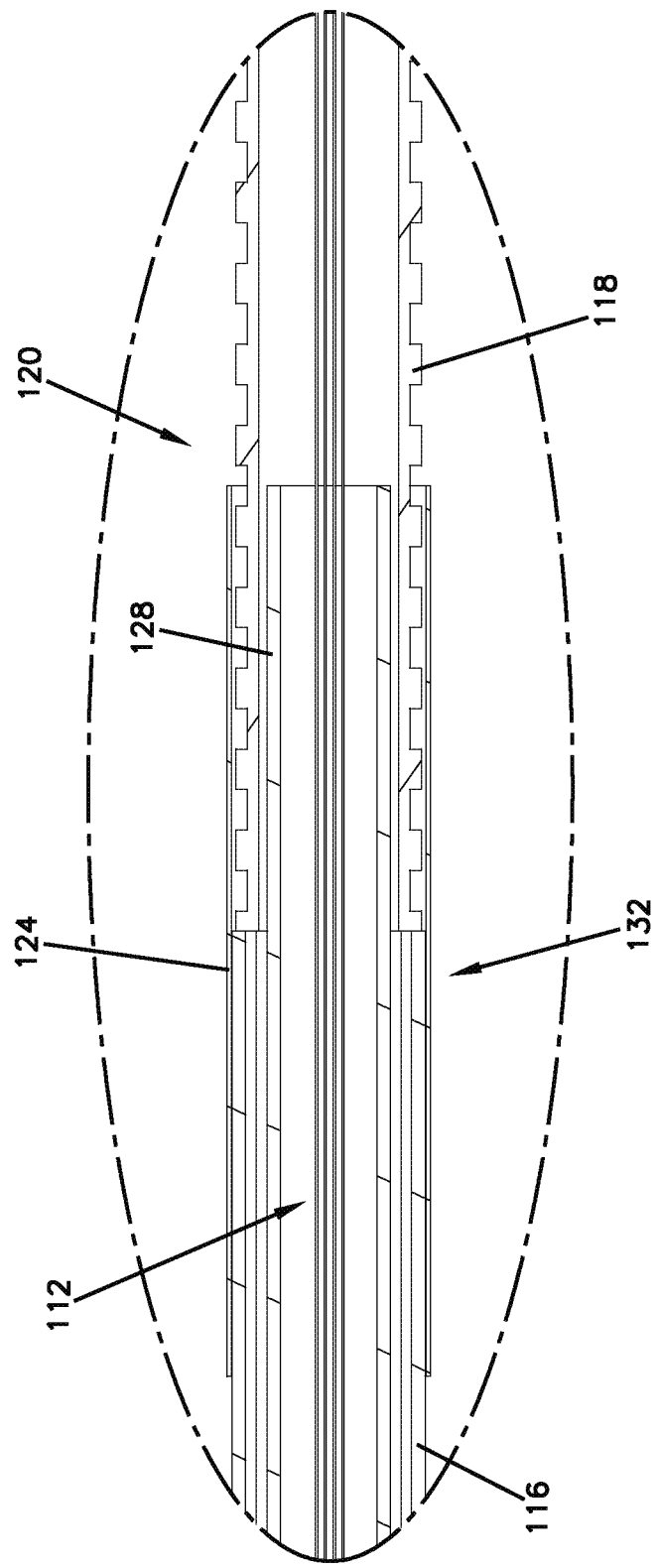
FIG. 9 illustrates an enlarged cross-sectional view of a portion of the fiber optic cable shown in FIG. 8.

FIG. 9 is a closer view of a portion of the fiber optic cable 110 as shown in FIG. 8. The coupling device 124 can be configured to seal and adhere the junction 132 at the proximal end 120 of the flexible conduit 118 so that junction 132 is protected and that it remains strong enough to allow maneuverability during the installation process.

Figure 10:
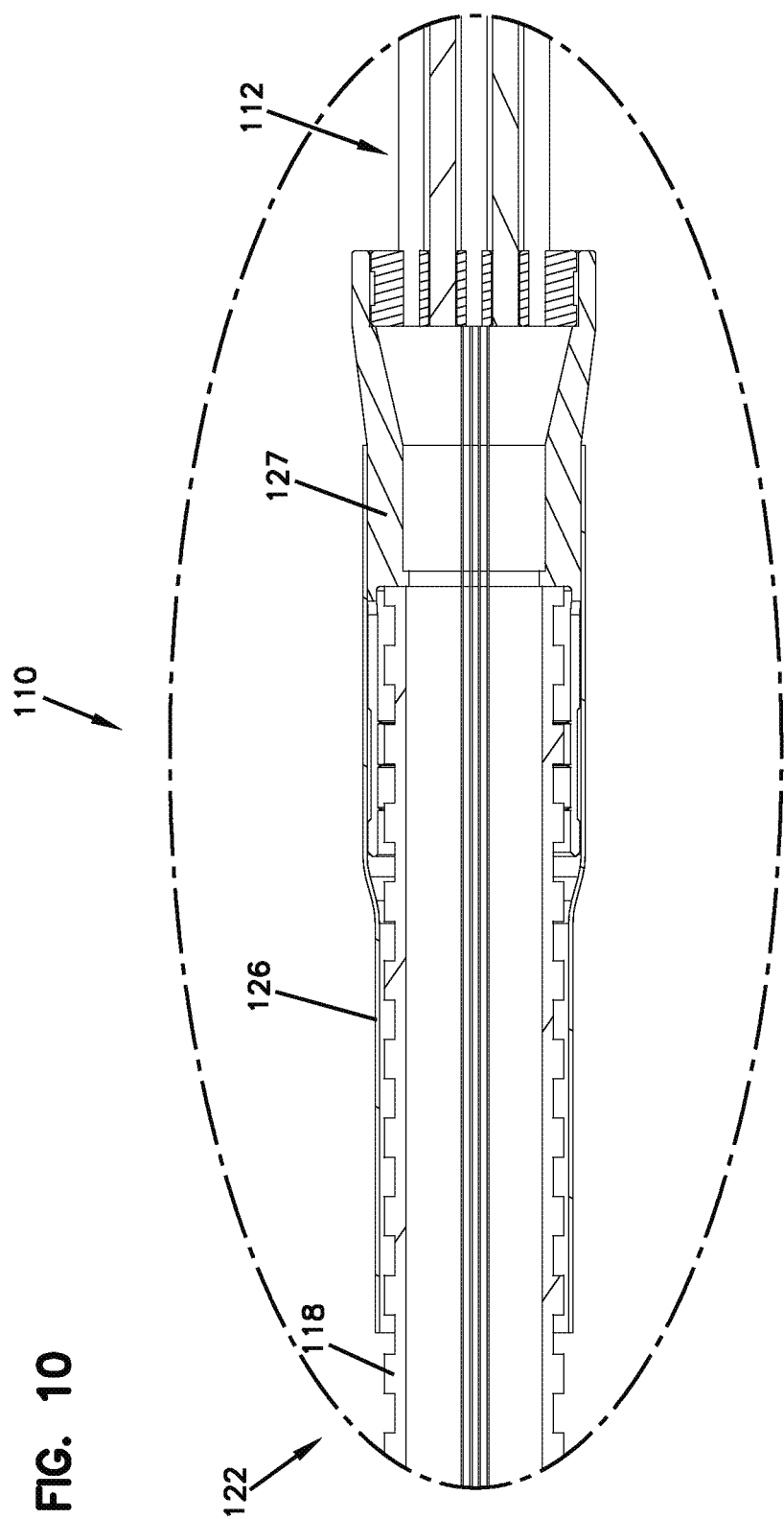
FIG. 10 illustrates an enlarged cross-sectional view of a portion of the fiber optic cable shown in FIG. 8.

FIG. 10 is a closer view of a portion of the fiber optic cable 110 as shown in FIG. 8. The terminating device 126 located adjacent the distal end 122 of the flexible conduit 118 can also include a fan-out device 127. The fan-out device 127 can include a body portion 129 and a fan-out cap 131. The fan-out cap 131 can be configured to fit within at least a portion of the fan-out body portion 129. The fan-out body portion 129 can be configured to be fit around a portion of the flexible conduit portion 118. Specifically, the fan-out device 127 can be configured to be fit over the outside of the distal end 122 of the flexible conduit 118. In some embodiments, the fan-out device 127 can be secured to the flexible conduit 118 by way of an epoxy. In other embodiments, the fan-out device 127 can be secured to the fiber optic cable 110 by the terminating device 126.

FIG. 11 is a breakout view of a portion of the fiber optic cable 110. In the depicted embodiment, a portion of the outer jacket 116 of the trunk cable portion 114 can be stripped back from the end of the trunk cable portion 114 to expose a portion of the inner conduit 128. In some embodiments, the trunk cable portion 114 can include a plurality of strength members 130 which can also be stripped together with the outer jacket 116. The strength members can be aramid yarn to improve the strength of the cable. The proximal end 120 of the flexible conduit 118 can then be secured to the inner conduit 128, thereby joining the flexible conduit portion 118 and the trunk cable portion 114, creating the junction 132. In some embodiments, epoxy may be used to strengthen the connection between the inner conduit 128 and the flexible conduit 118. A coupling device 124 can then be secured over the junction 132. In some embodiments, the coupling device 124 may be loosely disposed around either the trunk cable portion 114 or the flexible conduit portion 118, prior to installation around the junction 132. Specifically, in some embodiments, the coupling device 124 can be secured to the outer jacket 116 and the outer surface of the flexible conduit portion 118. In some embodiments, the coupling device 124 is a heat shrink material. In such an embodiment, after the coupling device 124 is placed around the junction 132, a heat source is used to activate the heat shrink material to seal and secure the junction 132. The strength members 130 can be included under the heat shrink material and/or within the epoxy between the inner conduit 128 and the flexible conduit 118.

FIG. 12 is a breakout view of a portion of the fiber optic cable 110. In some embodiments, the terminating device 126 may secured to the distal end 122 of the flexible conduit portion 118 alone, allowing the plurality of optical fibers 112 to pass through the terminating device 126 unaltered. In other embodiments, the fan-out device 127 can be used. The body 129 of the fan-out device 127 may be coupled to the distal end 122 of the flexible conduit 118. The fan-out device cap 131 can then be secured to the body 129, effectively breaking out the optical fibers 112, providing each fiber 112, or groups of fibers 112, with its own furcation tube 115. The terminating device 126 can then be secured around the fan-out device 127 and the distal end 122 of the flexible conduit portion 118. Similar to the coupling device 124, the terminating device 126 can be a heat shrink material in some embodiments. In such an embodiment, after the terminating device 126 is placed around the fan-out device 127 and the distal end 122 of the flexible conduit portion 118, a heat source can be used to activate the heat shrink material to seal and secure the terminating device 126 to the fan-out device 127 and the flexible conduit portion 118.

Figure 13:
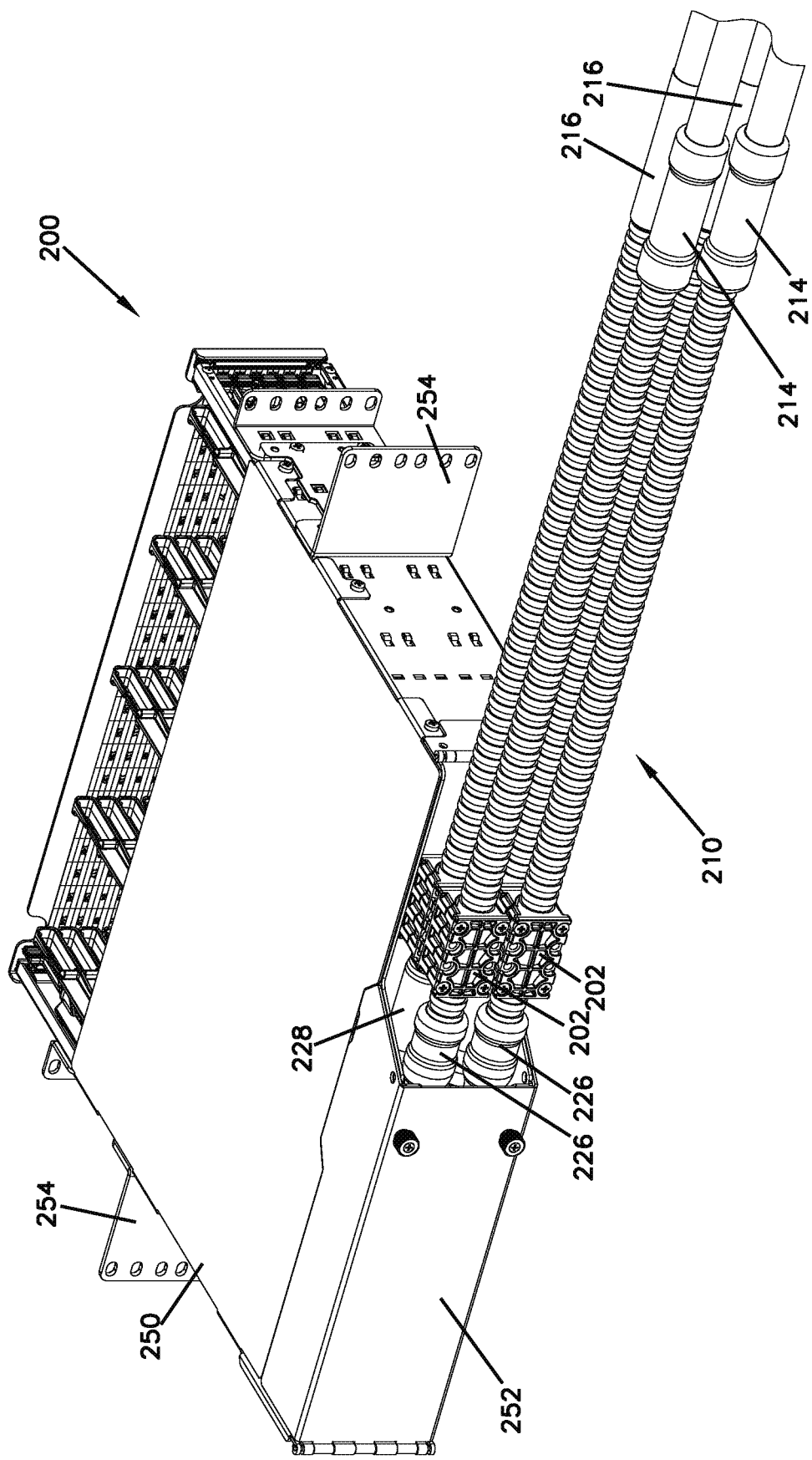
FIG. 13 illustrates a perspective view of a piece of telecommunications equipment, including a plurality of fiber optic cables secured thereto, according to one embodiment of the present disclosure.

FIG. 13 is a perspective view of telecommunications equipment 200. In the depicted embodiment, a plurality of fiber optic cables 210, similar to those described above, are shown connected to telecommunications equipment 200. The telecommunications equipment 200 can include a top cover 250 and a rear cover 252 to cover the internal components of the telecommunications equipment 200. The telecommunications equipment 200 can also include a plurality of mounting brackets 254. The mounting brackets 254 can be configured to be mounted to standard storage solutions for telecommunications equipment 200. For illustration purposes, two of the fiber optic cables 210 use an overmold for a coupling device 214 and a termination device 226, and two cables use heat shrink material for a coupling device 216 and a termination device 228. It is contemplated to be within the scope of this application that any combination of fiber optic cables 210 using differing coupling and termination devices can be used together. As shown, the fiber optic cables 210, specifically the ends that include the terminating devices 226, can be connected to a piece of telecommunications equipment 200. In some embodiments, the fiber optic cables 210 can be secured to the telecommunications equipment 200 using clamps 202. The flexible conduit portions 18, 118 can be bent as desired to facilitate use with equipment 200.

Figure 14:
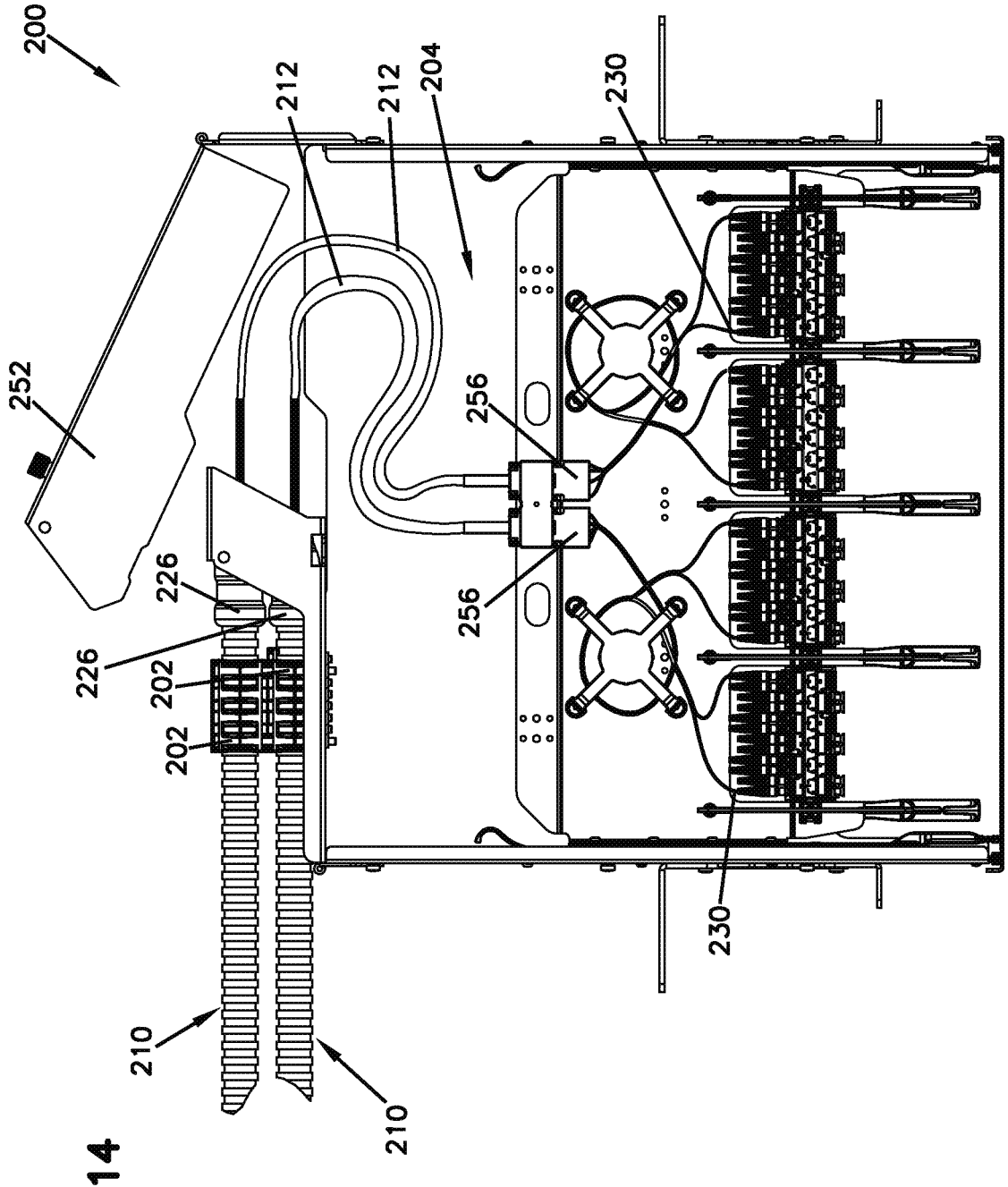
FIG. 14 illustrates a top view of the piece of telecommunications equipment of FIG. 13 with a top cover removed, a rear cover pivoted open, and representative internal cables.

FIG. 14 is a top view of the telecommunications equipment 200 of FIG. 13. FIG. 14 is shown with the top cover 250 removed and the rear cover 252 partially open. As depicted, the internal components 204 of the telecommunication equipment 200 are visible. In some embodiments, the plurality of optical fibers 212 within each fiber optic cable 210 may enter the telecommunications equipment 200 and be connected at a termination location 230 within the telecommunications equipment 200. The termination locations 230 are in the form of LC type adapters, for each receiving two aligned connectors 13. Other connector and adapter types are possible, such as SC type (single fiber) and MPO type (multiple fibers). As shown, four LC blocks are used in equipment 200 for each tray. Other blocks of adapters, duplex adapters, simplex adapters, and MPO adapters can be used. Modules with internal breakouts or splitters can also be used.

Figure 15:
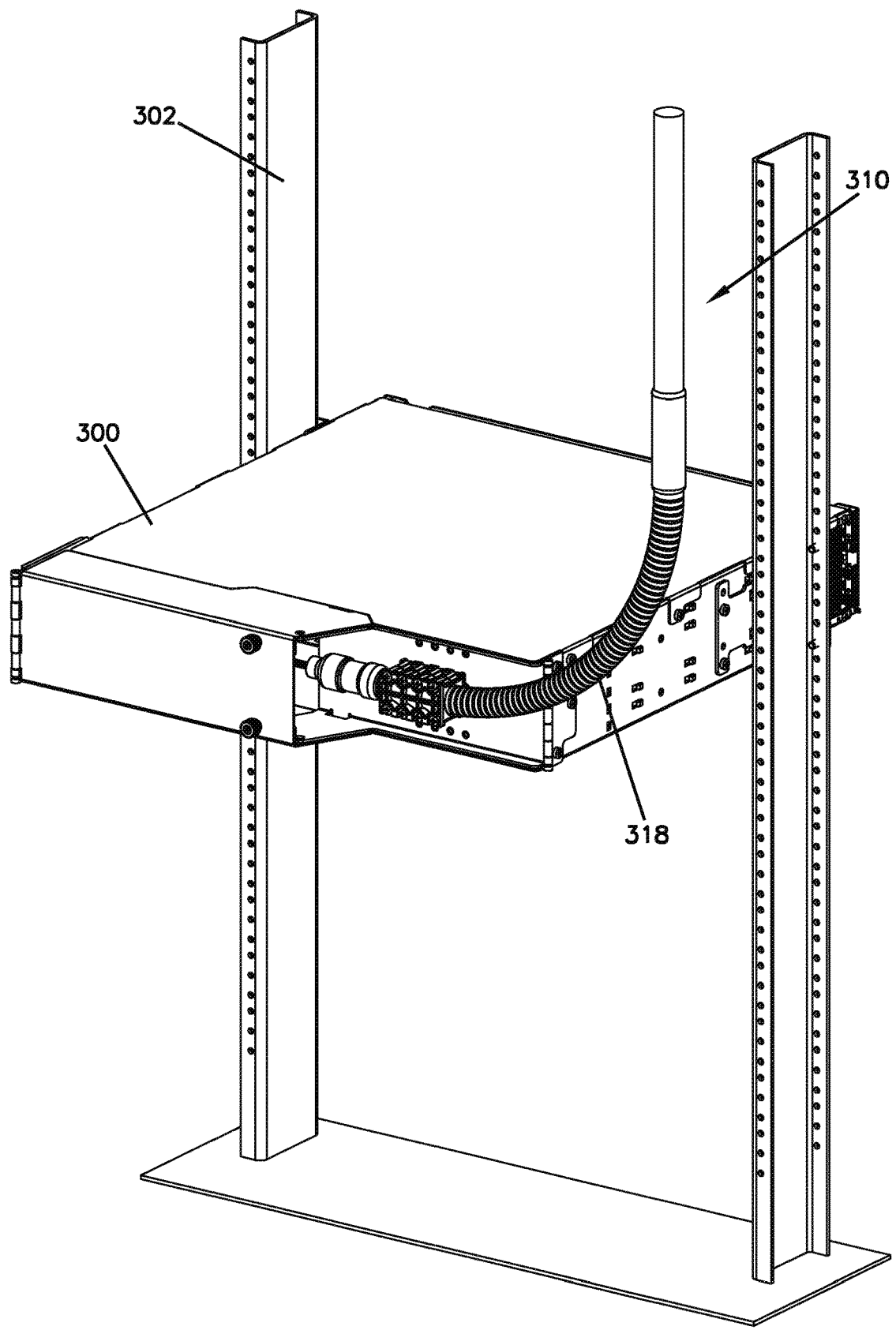
FIG. 15 illustrates a perspective view of a piece of telecommunications equipment mounted to a rack, according to one embodiment of the present disclosure.

FIG. 15 is a perspective view of telecommunications equipment, according to one embodiment of the present disclosure. The telecommunications equipment 301 can include a frame or chassis 300. The frame or chassis 300 can be mounted to a rack 302. In some embodiments, the rack 302 may be configured to hold a plurality of frames or chassis 300. As shown, a fiber optic cable 310 can be bent prior to entering the chassis 300. The fiber optic cable 310 can include a flexible conduit portion 318 to allow for such maneuverability like bending. It is also contemplated that the fiber optic cables 310 may wrap around a side of the frame or chassis 300.

In accordance with some aspects of the disclosure, the flexible conduit portions 18, 118, 318 have greater flexibility than trunk cable portions 14, 114. Further, the jacket or jackets of trunk cable portions 14, 114 terminate such that only optical fibers are contained within a portion of flexible conduit portions 18, 118, 318 to both protect the optical fibers and allow for increased bending of the cable relative to the stiffer trunk cable portions 14, 114. Preferably, each flexible conduit portion 18, 118, 318 includes a terminating device 26, 126 to allow the optical fibers to exit the flexible conduit portions 18, 118, 318, and to enter fiber optic telecommunications equipment.

In some implementations, the flexible conduit portions 18, 118, 318 can be filled with a gel substance. The gel substance aids in weatherproofing the flexible conduit as the gel is water-blocking. The sealant can be advantageous if the fiber optic cable is installed outdoors. In some embodiments, the trunk cable can be filled with the gel. In other embodiments, the gel can be inserted into the flexible conduit after the conduit is filled with optical fibers from the open end near the terminating device 26, 126. In still other embodiments, the flexible conduit may include the gel prior to the installation of the optical fibers within the flexible conduit. In other embodiments still, the flexible conduit can include a port configured to receive the gel that is be inserted into the flexible conduit. It will be appreciated that various materials can be used to in substitute for the gel to weather proof the flexible conduit.

Figure 16:
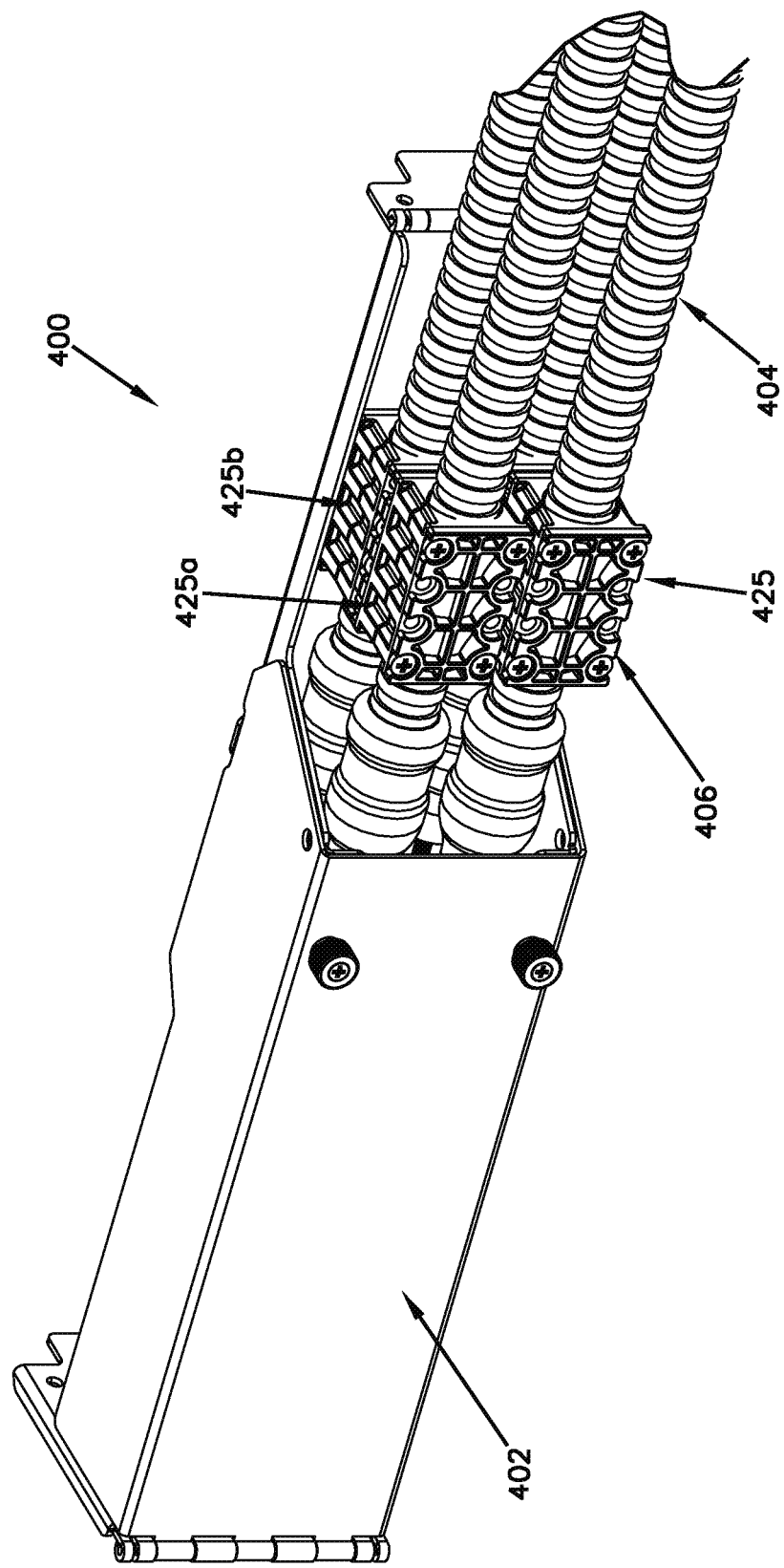
FIG. 16 illustrates a perspective view of a piece of telecommunications equipment, including a modular clamping system, according to one embodiment of the present disclosure.

FIG. 16 is a perspective view of telecommunications equipment 400 at which optical cables are received. Specifically, the telecommunication equipment 400 includes a rear cover 402, a plurality of fiber optic cables 404 similar to the fiber optic cables described above, and a modular clamping system 406. The rear cover 402 can be similar to the rear cover 252 shown and described with respect to FIG. 13. In addition, in some embodiments, the rear cover 402 may be mounted to the chassis 300, as shown in FIG. 15. Additional details regarding examples of the rear cover 402 and chassis 300 can be found in U.S. Patent Publication No. 2015/0370025, titled "Fiber Optic Cable with Flexible Conduit," the disclosure of which is incorporated herein by reference. Further, the modular clamping system 406 is configured to secure the fiber optic cables 404 to the rear cover 402.

A first cable 404 can be secured to the rear cover 402 using a first clamp 425a. In some implementations, a second cable 404 can be secured to the rear cover 402 by mounting a second clamp 425b to the first clamp 425a. In certain implementations, the structure of the first clamp 425a and the structure of the second clamp 425b are substantially identical. Each clamp 425s, 425b defines holes that align with each other. As will be described in more detail herein, to secure the first clamp 425a directly to the rear cover 402, fasteners are inserted through only some of the holes. Other holes defined by the first clamp 425a are left empty. To secure the second clamp 425b to the first clamp 425a, fasteners are inserted through the holes defined by the second clamp 425b that correspond with the holes that had been left empty in the first clamp 425a. The fasteners also extend through the previously empty holes of the first clamp 425a to reach the rear cover 402.

Figure 17:
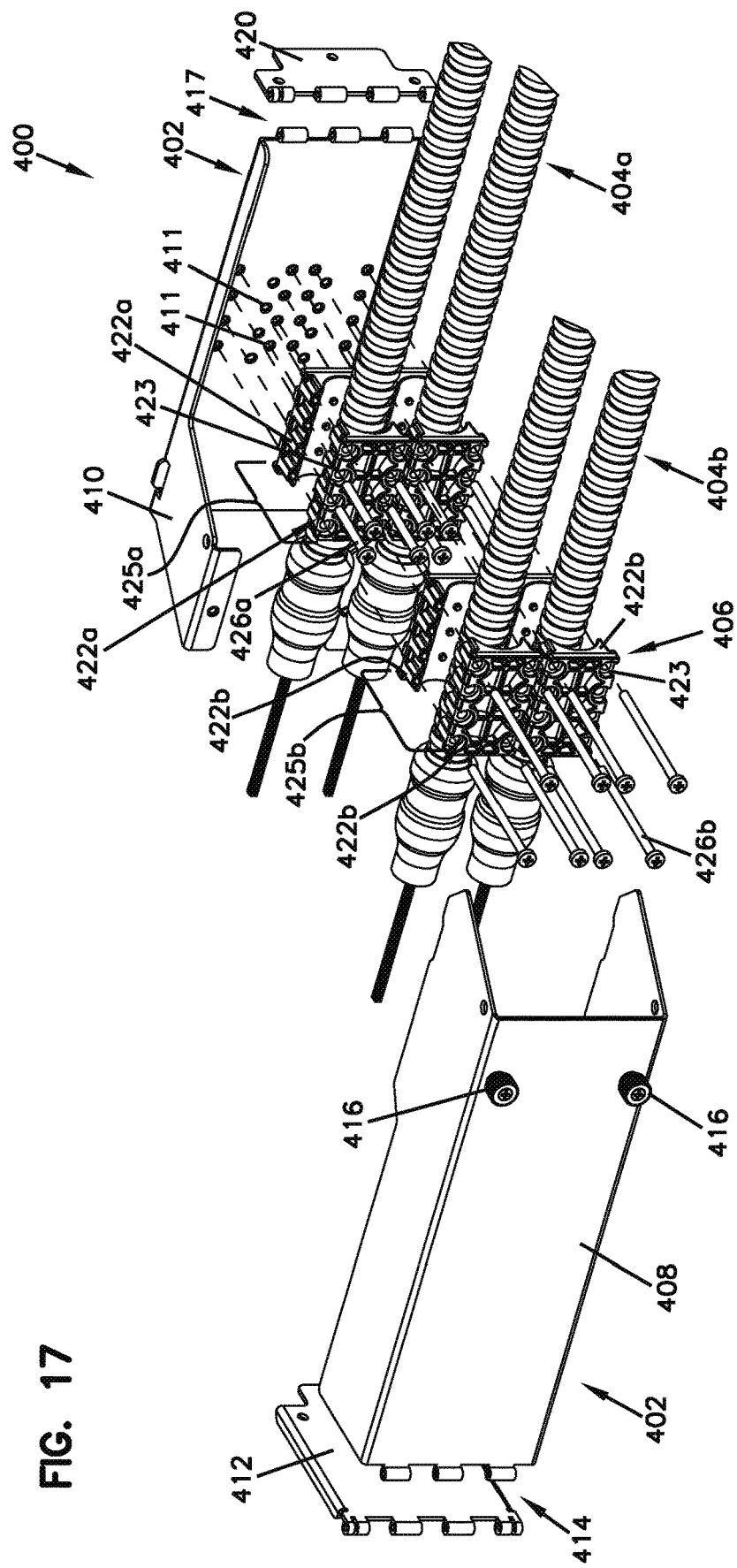
FIG. 17 illustrates an exploded perspective view of the telecommunications equipment shown in FIG. 16.

FIG. 17 is an exploded view of the telecommunications equipment 400, as shown in FIG. 16. In the depicted embodiment, the rear cover 402 can include an outside portion 408, an inside portion 410, and an end portion 412. In some embodiments, the outside portion may be connected to the end portion 412 by way of a hinge 414 to allow for the outside portion 408 to swing open away from the plurality of fiber optic cables 404. In some embodiments, the outside portion 408 may be secured to the inside portion 410 by way of two thumb screws 416. Further, the inside portion 410 of the rear cover 402 can also include a hinge 417 and a mounting plate 420 for mounting to a chassis similar to the chassis 300, as shown in FIG. 15. The inside portion 410 of the rear cover 402 also includes a plurality of mounting holes 411. The mounting holes 411 are configured to help secure the modular clamping system.

The modular clamping system 406 can include a plurality of clamp halves 422. Each clamp half 422 is paired with a corresponding clamp half 422 to form a complete clamp 425, thereby securing a single fiber optic cable 404. Each clamp half 422 can include a plurality of mounting holes 423 configured to receive a plurality of clamp fasteners 426. In the example shown in FIG. 17, four first clamps 425a hold two first optical cables 404a and four second clamps 425b hold two second optical cables 404b. In other examples, a greater or lesser number of clamps 425 can be utilized to hold optical cables 404 at the rear cover 402.

The first clamps 425a each include a pair of clamp halves 422a and the second clamps 425b each include a pair of clamp halves 422b. In certain embodiments, the clamp halves 422a of the first clamp 425a can be joined by a plurality of clamp fasteners 426a and the clamp halves 422b of the second clamp 425b can be joined by a plurality of clamp fasteners 426b. In some embodiments, the fasteners may be threaded. In other embodiments, the fasteners may be a bolt and nut combination. Each fastener 426 is configured to mate a pair of clamping halves 422 together and to mount the clamped fiber optic cable 404 to the inside portion 410 of the rear cover 402. In the depicted embodiment, the fiber optic cables 404 are attached to the rear cover 402 by way of eight clamping halves 422 and sixteen clamp fasteners 426.

The fiber optic cables 404a that are positioned nearest to the inside portion 410 of the rear cover 402 are secured to the rear cover 402 using the clamp halves 422a. The fiber optic cables 404b are secured to the rear cover 402 using the clamp halves 422b. As shown, the fasteners 426a used with the clamp halves 422a are shorter than the fasteners 426b. Once the fiber optic cables 404a nearest the inside portion 410 of the rear cover 402 are secured, the outside fiber optic cables 404b may be secured without removing the clamp halves 422a that surround the inside fiber optic cable 404a. The outside clamping halves 422b use longer fasteners 426b that pass through both the outside clamping halves 422b and the inside clamping halves 422a before passing through the mounting holes 411 of the inside portion 410 of the rear cover 402.

Figure 18:
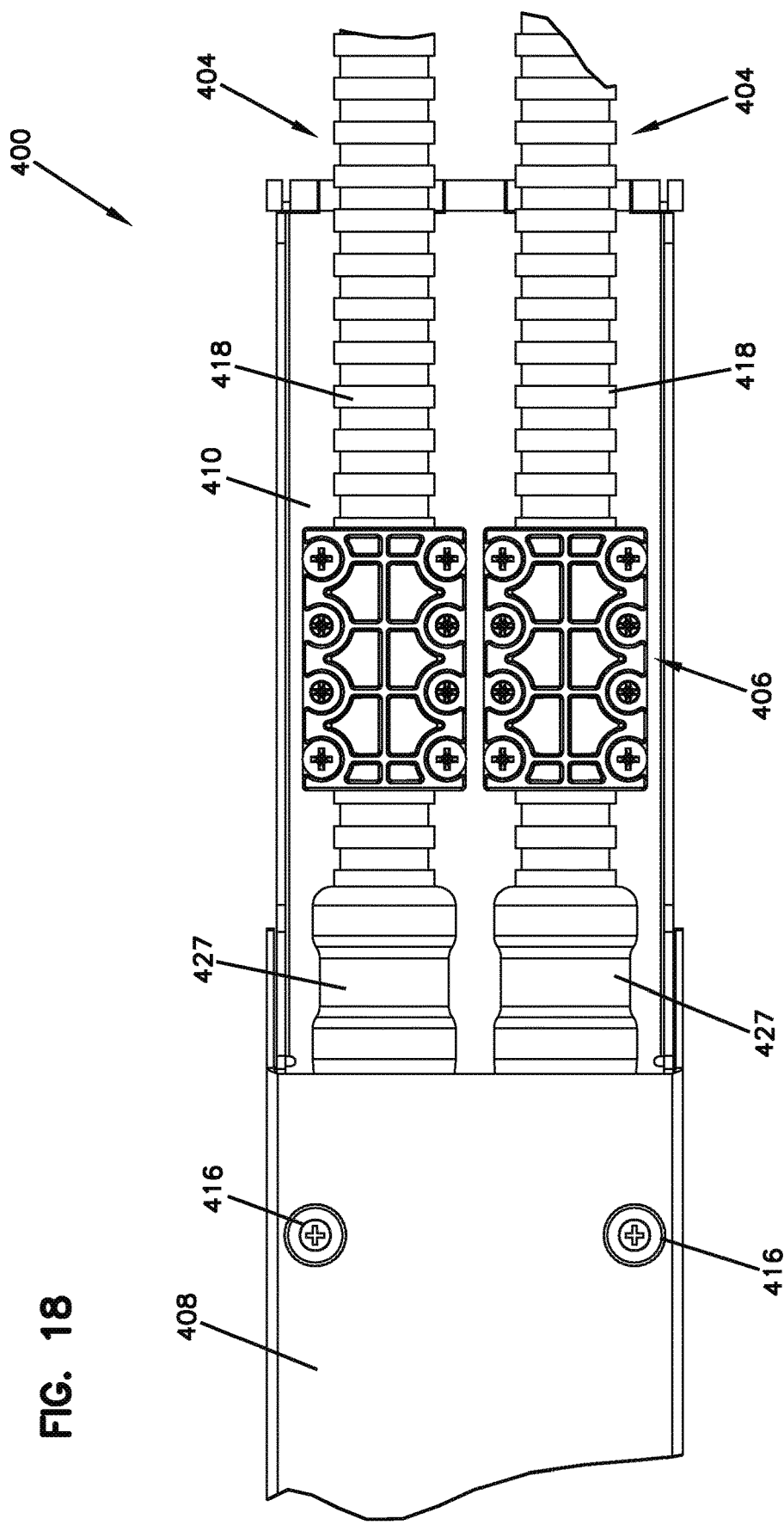
FIG. 18 illustrates a side view of the telecommunications equipment shown in FIG. 16.

FIG. 18 is a side view of the telecommunications equipment 400, as shown in FIG. 16. In the depicted embodiment, the modular clamping system 406 can mount the fiber optic cables 404 to the inside portion 410 of the rear cover 402 at a point on the flexible conduits 418 prior to the terminating devices 427.

Figure 19:
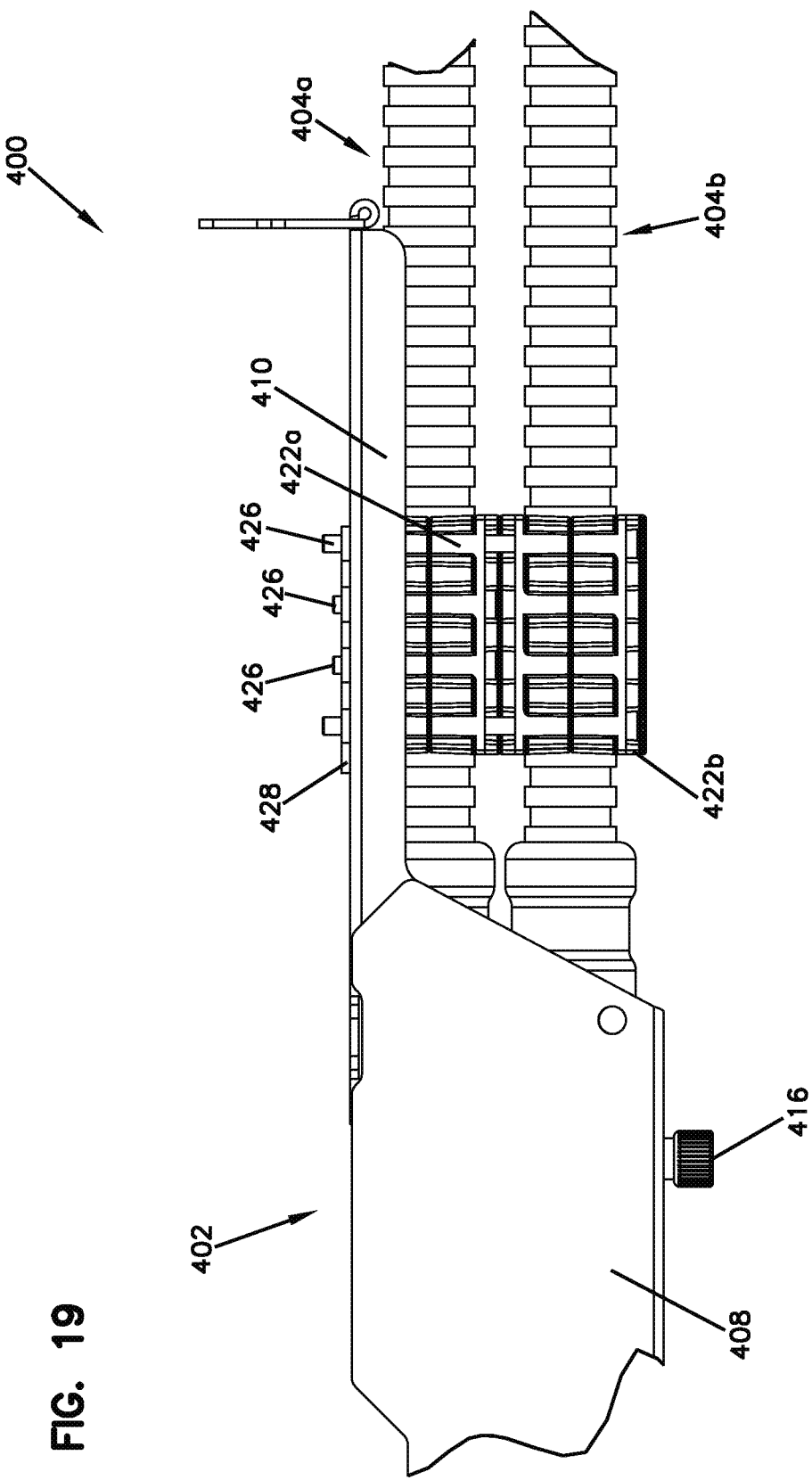
FIG. 19 illustrates a top view of the telecommunications equipment shown in FIG. 16.

FIG. 19 is a top view of the telecommunications equipment 400, as shown in FIG. 16. In the depicted embodiment, the fasteners 426 can pass through the clamping halves 422a, 422b, the inside portion 410 of the rear cover 402, and through a washer device 428 to secure the fiber optic cables 404. In addition, as depicted, the clamp halves 422a, 422b can be mounted directly adjacent to one another.

Figure 20:
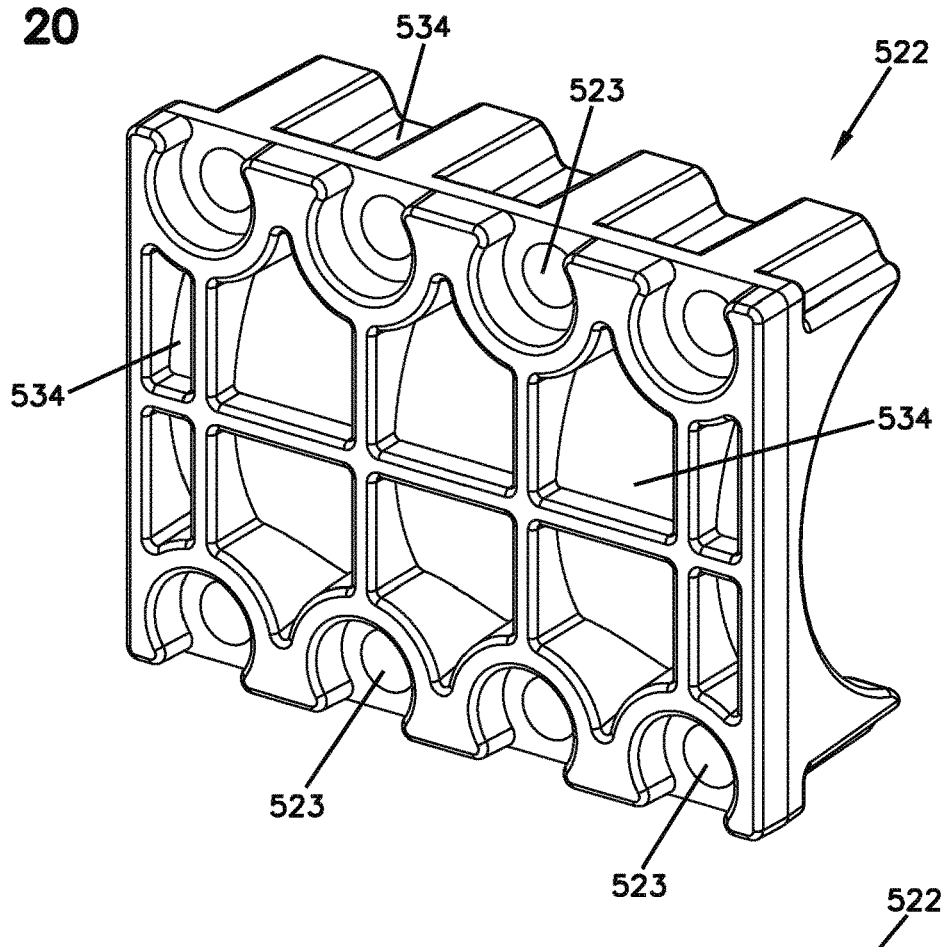
FIG. 20 illustrates a perspective view of a clamp half according to one embodiment of the present disclosure.
Figure 21:
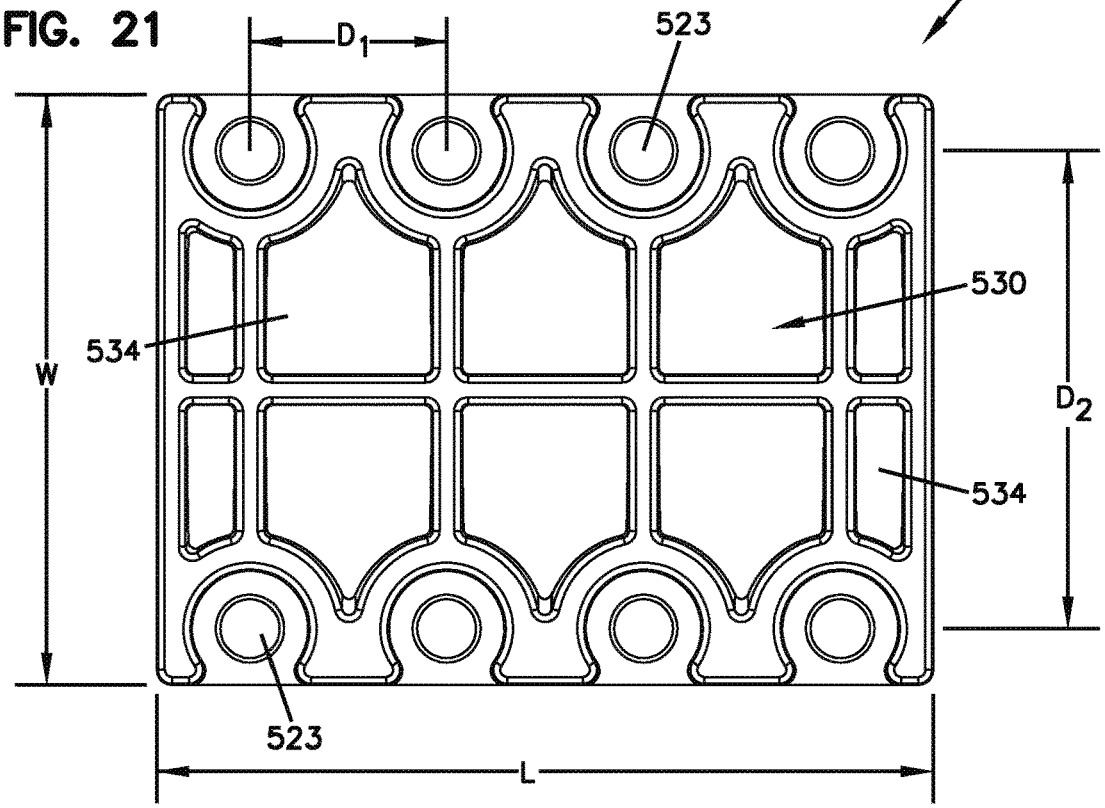
FIG. 21 illustrates a front view of the clamp half shown in FIG. 20.
Figure 22:
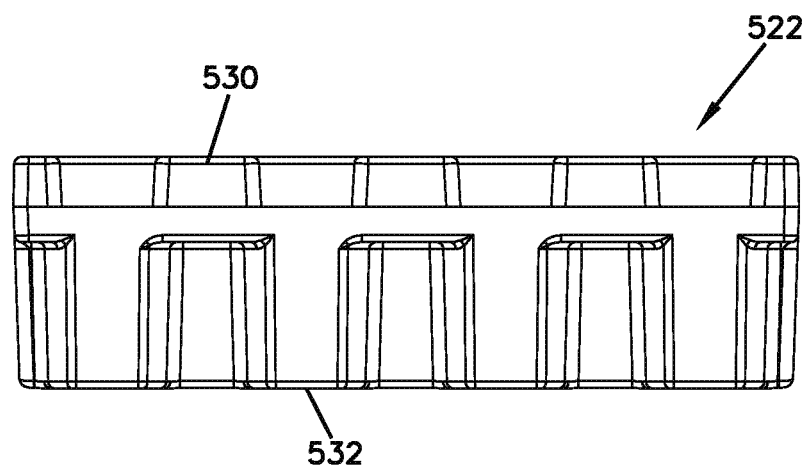
FIG. 22 illustrates a top view of the clamp half shown in FIG. 20.

FIGS. 20-22 show a clamp half 522, according to one embodiment of the present disclosure. FIG. 20 is an isometric view of the clamp half 522, FIG. 21 is a front view of the clamp half 522, and FIG. 22 is a top view of the clamp half 522. The clamp half 522 can have a length L and a width W. In some embodiments, the length L can be between about 54 and about 56 millimeters. In other embodiments, the length L can be about 55 millimeters. In other embodiments, the width W can be between about 33 and about 43 millimeters. In other embodiments, the width W can be about 42 millimeters. In other embodiments, the width W can be about 34 millimeters.

The clamp half 522 also includes a plurality of mounting holes 523 that pass through the clamp half 522 from a front face 530 to a rear face 532. The mounting holes may be spaced along the length L of the clamp half 522 at a distance D1. In addition, the mounting holes 523 may be space along the width W of the clamp half 522 at a distance D2. In some embodiments, the distance D1 can be between about 12 and about 16 millimeters. In other embodiments, the distance D1 can be about 14 millimeters. In other embodiments, the distance D2 can be between about 25 and about 35 millimeters. In other embodiments, the distance D2 can be about 34 millimeters. In other embodiments, the distance D2 can be about 26 millimeters.

In the depicted embodiment, the mounting holes 523 have a stepped bore. The clamp half 522 may have a plurality of indentations 534 to help minimize the amount of material needed to manufacture the clamp half 522. In some embodiments, the clamp half 522 may be made from polycarbonate-ABS.

Figure 23:
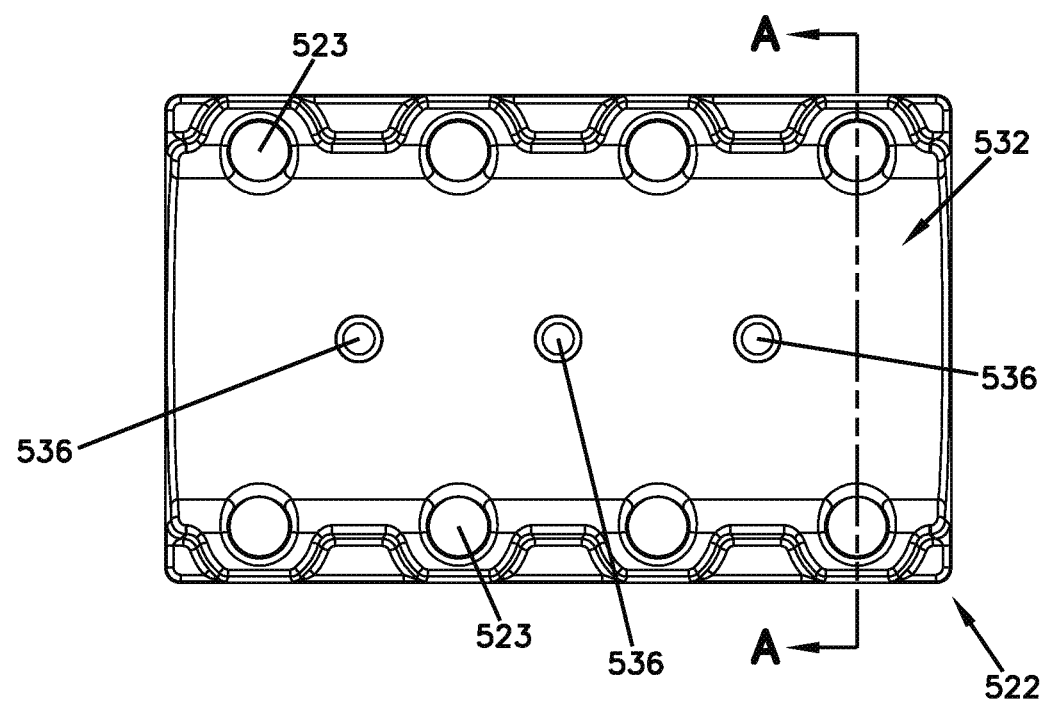
FIG. 23 illustrates a rear view of the clamp half shown in FIG. 20.

FIGS. 23-24 show a rear view of the clamp half 522 and side sectional view along line A-A of the clamp half 522, respectively. The rear face 532 of the clamp half 522 can have an end profile having an arcuate shape, as shown in FIG. 24. The arcuate end profile can have a first diameter R1 and a second diameter R2. In some embodiments, R1 and R2 are equal. In other embodiments, R1 and R2 can be different distances. The arcuate shape of the rear face 532 can be configured to nest against a flexible conduit like 18, 118, 318, or 418 mentioned above. The dimensions of both the rear face 532 arcuate profile and the overall clamp half 522 can be customized to fit a variety of different flexible conduit shapes. In some embodiments, the clamp half may be sized for a 288F cable with a flexible conduit attached. In other embodiments, the clamp half 522 may be sized for a 576 cable with a flexible conduit attached. In still other embodiments, the clamp half may be sized for a 864F cable with a flexible conduit attached. In some embodiments, when R1 and R2 are equal, the radius can be between about 23 millimeters and about 33 millimeters. In other embodiments, when R1 and R2 are equal, the radius can be about 24 millimeters. In other embodiments still, when R1 and R2 are equal, the radius can be about 32 millimeters.

In some embodiments, the rear face 532 has a plurality of securing protrusions 536. The securing protrusions 536 can be configured to be positioned within indentations, or grooves, of a flexible conduit like 18, 118, 318 or 418 mentioned above. By being positioned in the indentations or groves of the flexible conduit when mounted to the flexible conduit, the securing protrusions prevent the flexible conduit from moving in a direction along its central axis within the assembled clamp. In some embodiments, the securing protrusions 536 also can assist in preventing the flexible conduit from rotating relative the assembled clamp. Such securing protrusions 536 prevent the need to exert a high crushing force on the flexible conduit to prevent axial movement of the flexible conduit within the modular clamping system.

FIG. 25 is a close-up view of the stepped mounting hole 523 through the clamp half 522. The larger diameter portion 538 of the stepped mounting hole 523 can be sized to seat a fastener flush with the front face 530 of the clamp half 522. In some embodiments the mounting holes 523 may have a countersink, including a chamfer.

Figure 26:
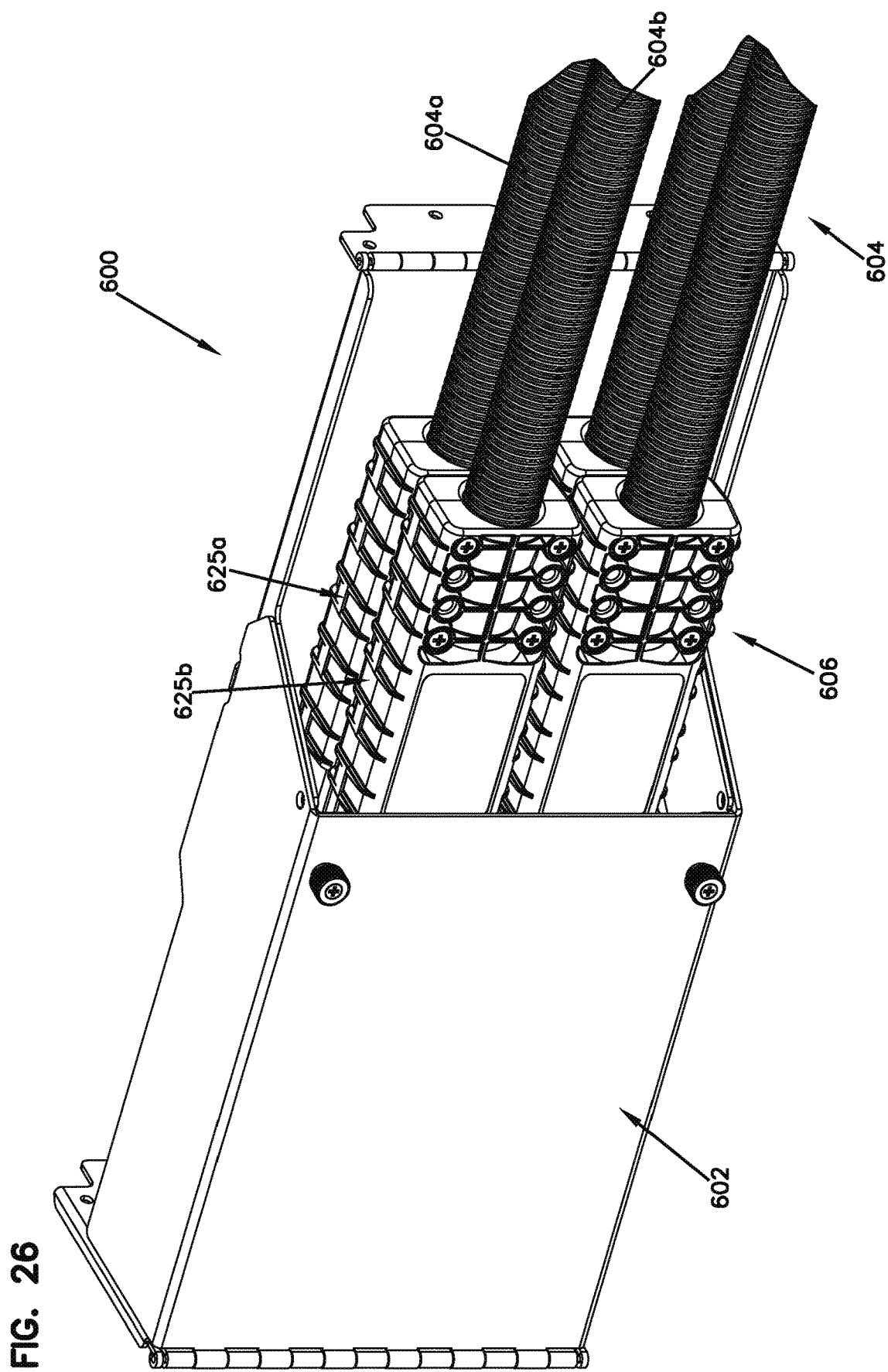
FIG. 26 illustrates a perspective view of a piece of telecommunications equipment, including a modular clamping system, according to one embodiment of the present disclosure.

FIG. 26 is a perspective view of telecommunications equipment 600 at which optical cables are received, according to one embodiment of the present disclosure. Similar to the embodiment depicted in FIG. 16, the telecommunication equipment 600 includes a rear cover 602, a plurality of fiber optic cables 604, and a modular clamping system 606. In the depicted embodiment, the modular clamping system 606 also includes a plurality of integral fan-out devices. The rear cover 602 can be similar to the rear cover 252 shown and described with respect to FIG. 13 and the rear cover 402 shown in FIG. 16. In addition, in some embodiments, the rear cover 602 may be mounted to the chassis 300, as shown in FIG. 15. Additional details regarding examples of the rear cover 602 and chassis 300 can be found in U.S. Patent Publication No. 2015/0370025, titled "Fiber Optic Cable with Flexible Conduit," the disclosure of which is incorporated herein by reference.

Similar to the embodiment depicted in FIG. 16, the modular clamping system 606 is configured to secure the fiber optic cables 604 to the rear cover 602. For example, first and second clamps 625a, 625b secure first and second cables 604a and 604b to the rear cover 602. In some implementations, the structure of the first clamp 625a and the structure of the second clamp 625b are substantially identical, and the second clamp 625b is mounted to the first clamp 625a. Additionally, like the modular clamping system 404 in FIG. 16, the modular clamping system 606 uses fasteners of varying sizes inserted through only some of the holes in the clamps 625a, 625b, to fasten the system 606 to the rear cover 602. Other holes defined by the second clamp 625b are left empty. To secure the second clamp 625b to the first clamp 625a, fasteners are inserted through the holes defined by the second clamp 625b that correspond with the holes that had been left empty in the first clamp 625a. The fasteners also extend through the previously empty holes of the first clamp 625a to reach the rear cover 602.

Figure 27:
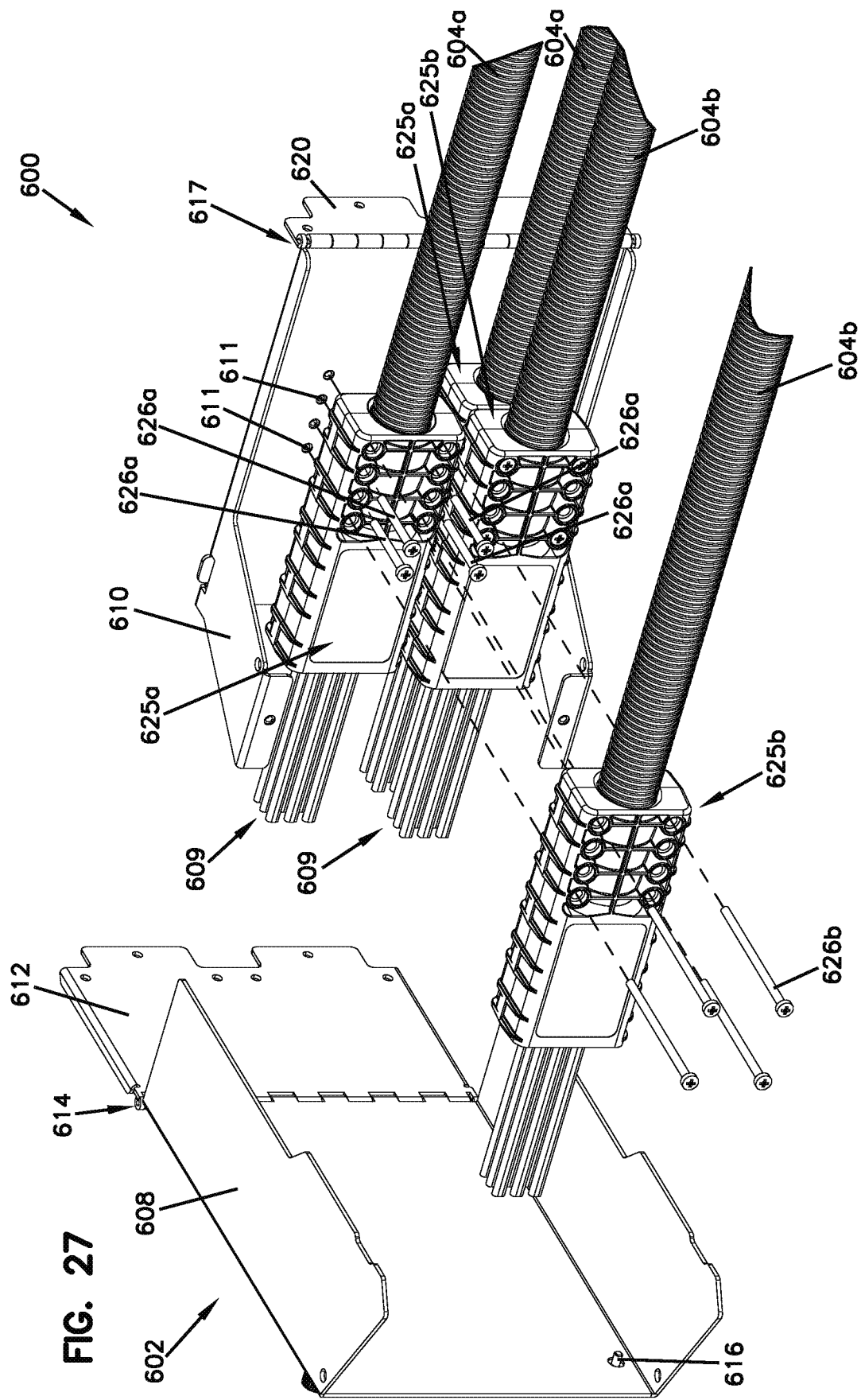
FIG. 27 illustrates an exploded perspective view of the telecommunications equipment shown in FIG. 26.

FIG. 27 is an exploded view of the telecommunications equipment 600, as shown in FIG. 26. In the depicted embodiment, and similar to the embodiment in FIG. 17, the rear cover 602 includes an outside portion 608, an inside portion 610, and an end portion 612. The outside portion 608 is connected to the end portion 612 by way of a hinge 614. In some embodiments, the outside portion 608 may be secured to the inside portion 610 by way of thumb screws 616. Further, the inside portion 610 of the rear cover 602 can also include a hinge 617 and a mounting plate 620 for mounting to a chassis similar to the chassis 300, as shown in FIG. 15. The inside portion 610 of the rear cover 602 also includes a plurality of mounting holes 611. The mounting holes 611 are configured to help secure the modular clamping system 606.

As depicted, four clamps 625 are used to secure four cables 604. In some embodiments, the clamps 625 may at least partially surround the fiber optic cables 604 and at least partially surround a plurality of furcation tubes 609. In some embodiments, the furcation tubes 609 are braided sleeves. In certain embodiments, the first clamp 625a can be secured to the inside portion 610 of the rear cover 602 by way of a plurality of fasteners 626a that pass through the mounting holes 611 of the inside portion 610 of the rear cover 602. In certain embodiments, the first clamp 625a is secured to the second clamp 625b, by way of another set of fasteners 626b. The fasteners 626b pass through the first and second clamps 625a, 625b and the mounting holes 611 of the inside portion 610 of the rear cover 602. In some embodiments, the fasteners may be threaded. In other embodiments, the fasteners may be a bolt and nut combination. Each fastener 626 is configured to pass through a clamp and mount the clamped fiber optic cable 604 to the inside portion 610 of the rear cover 602. In the depicted embodiment, the fiber optic cables 604 are attached to the rear cover 602 by way of four clamps 625 and sixteen clamp fasteners 626. Once the fiber optic cables 604a nearest the inside portion 610 of the rear cover 602 are secured by fasteners 626a, the outside fiber optic cables 604b may be secured using fasteners 626b without removing the clamps 625a that surround the inside fiber optic cable 604a.

Figure 28:
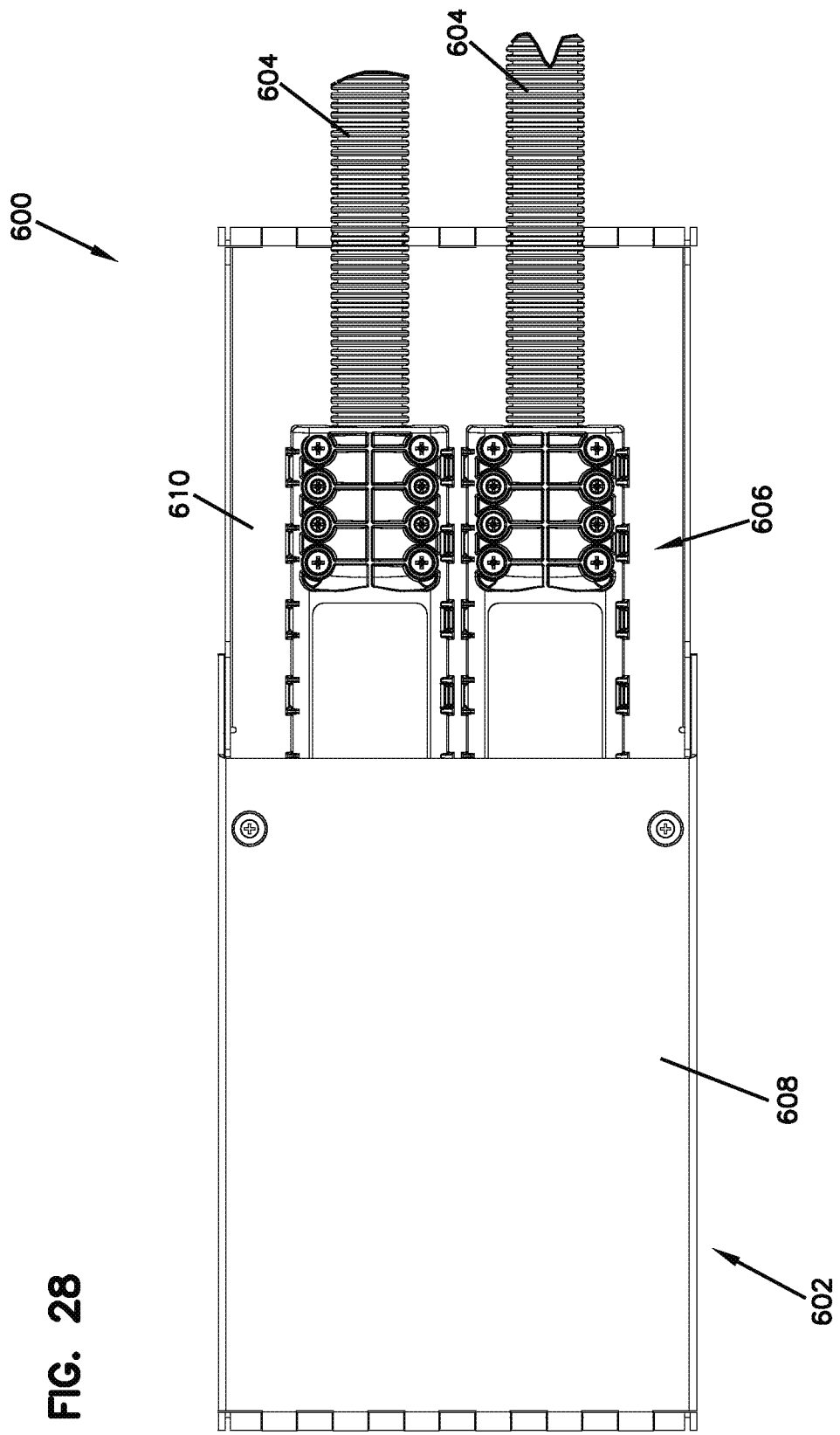
FIG. 28 illustrates a side view of the telecommunications equipment shown in FIG. 26.

FIG. 28 is a side view of the telecommunications equipment 600, as shown in FIG. 26. In the depicted embodiment, the modular clamping system 606 can mount the fiber optic cables 604 to the inside portion 610 of the rear cover 602. In some embodiments, the outside portion 608 of the rear cover 602 at least partially covers a portion of the modular clamping system 606.

Figure 29:
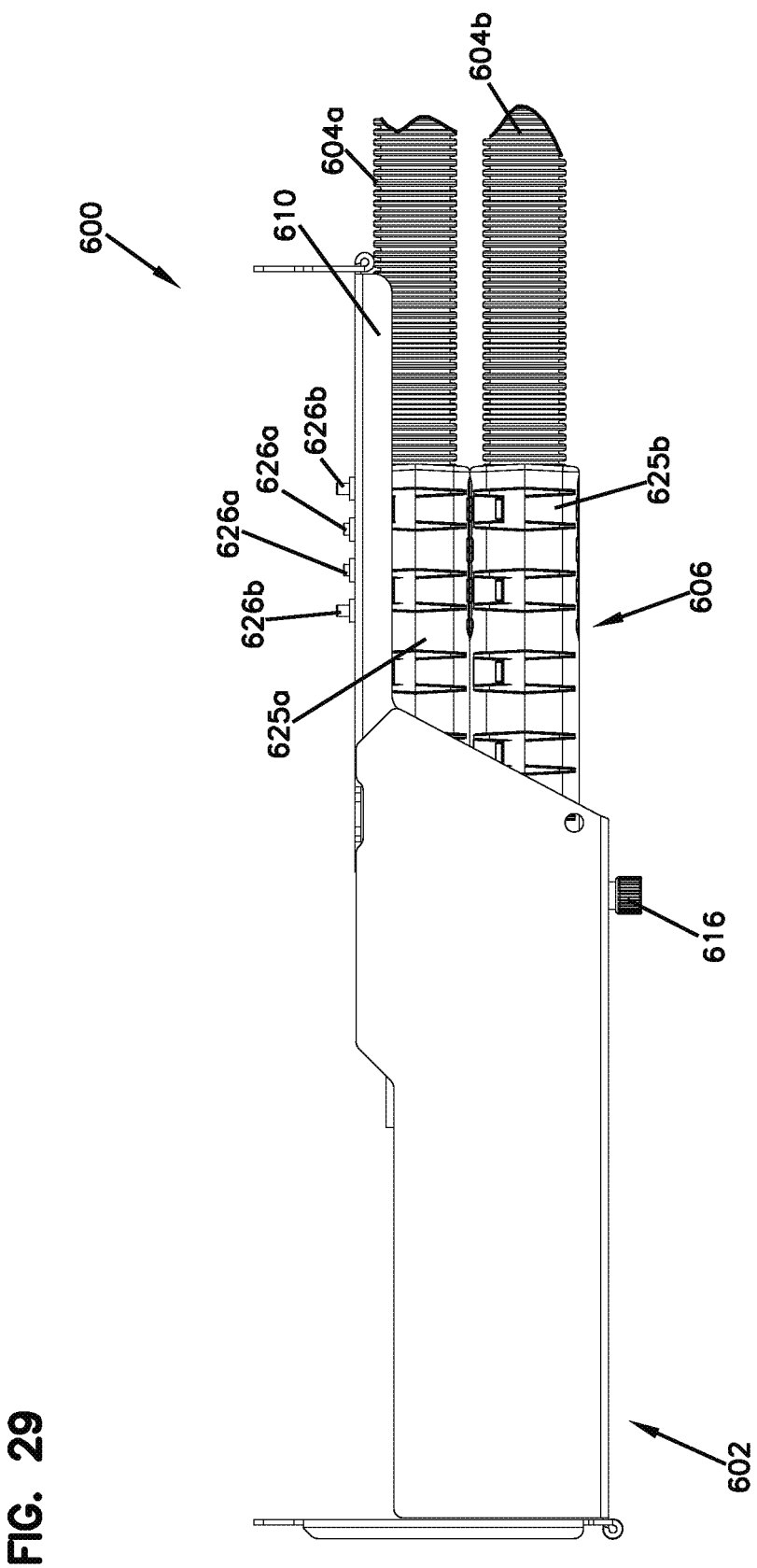
FIG. 29 illustrates a top view of the telecommunications equipment shown in FIG. 26.

FIG. 29 is a top view of the telecommunications equipment 600, as shown in FIG. 26. In the depicted embodiment, the fasteners 626 can pass through the clamps 625a and 625b and the inside portion 610 of the rear cover 602 to secure the fiber optic cables 604. In addition, as depicted, the clamps 625a, 625b can be mounted directly adjacent to one another.

Figure 30:
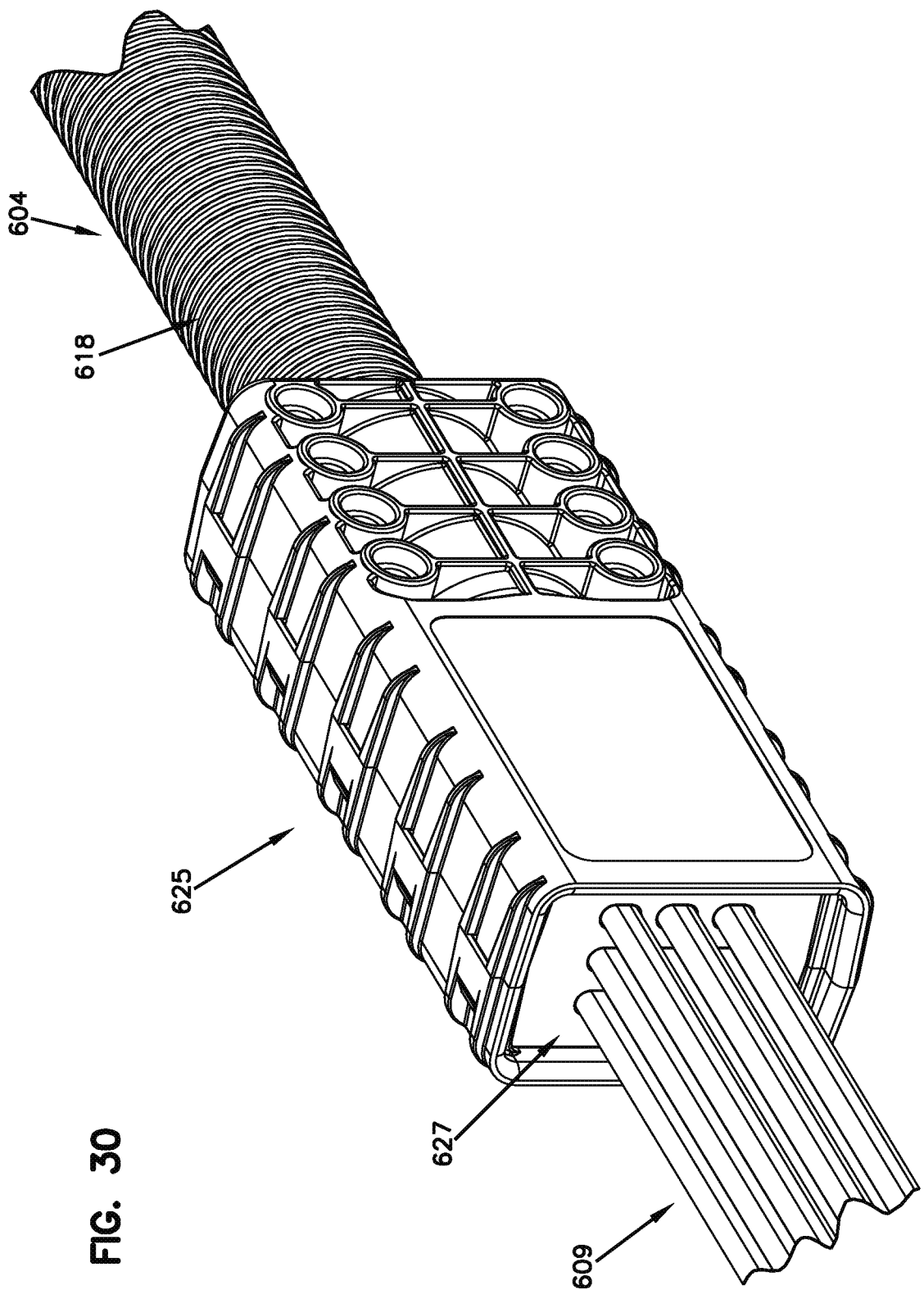
FIG. 30 illustrates a perspective view of a clamp mounted to a fiber optic cable according to one embodiment of the present disclosure.

FIG. 30 is a perspective view of a clamp 625 secured to a fiber optic cable 604. As shown, one end of the clamp 625 is configured to mount over a portion of the fiber optic cable 604, specifically the portion having a flexible conduit 618. The other end of the clamp 625 is shown to include a fan-out device 627. The fan-out device 627 can be configured to separate optical fibers contained within the fiber optic cable 604. In some embodiments, each fiber has their own furcation tube 609 for protection.

Figure 31:
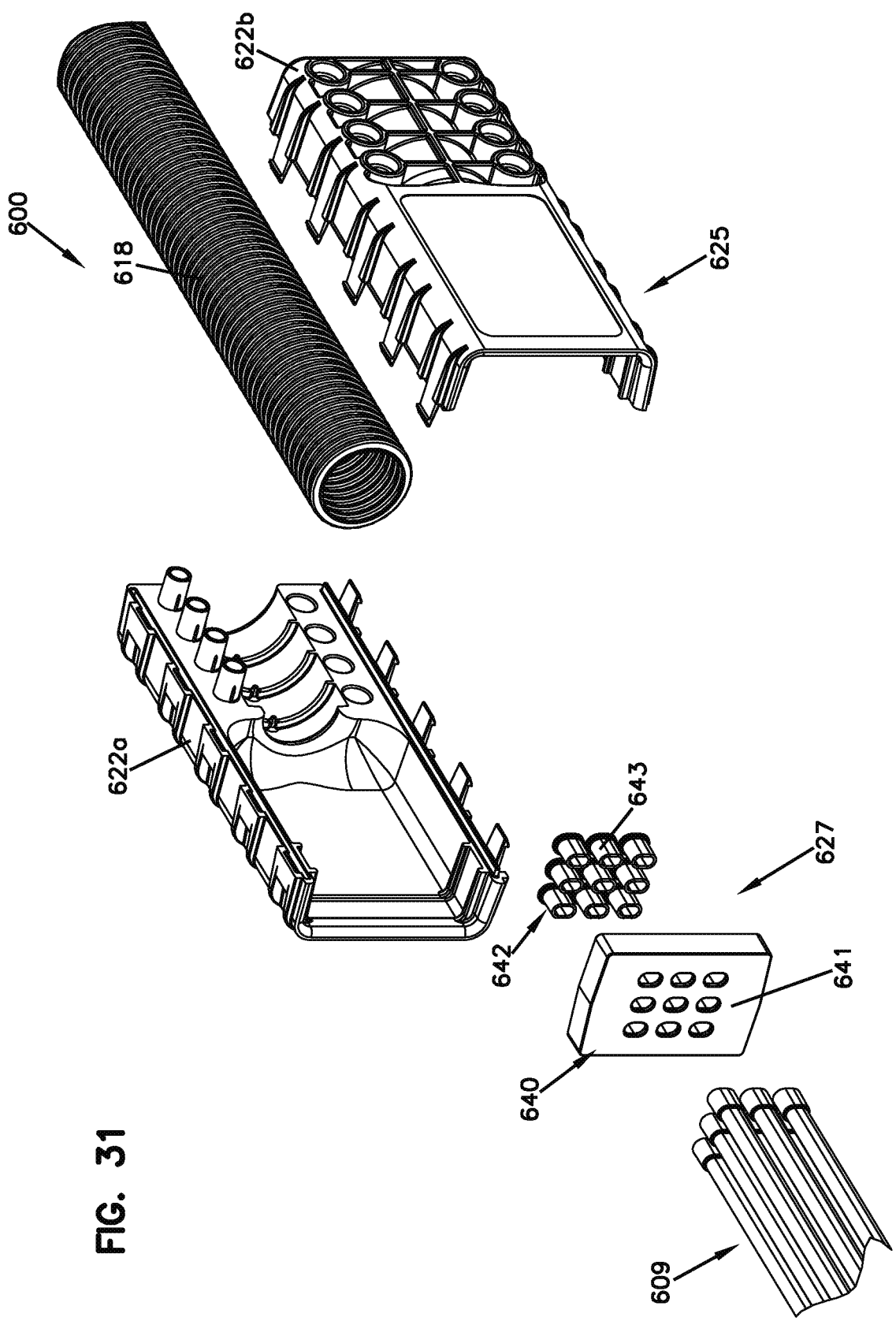
FIG. 31 illustrates an exploded perspective view of the clamp shown in FIG. 30.

FIG. 31 is an exploded view of a clamp 625. In the depicted embodiment, the clamp 625 can include two halves 622a, 622b. Each half is configured to interface with the other half so as to encase a portion of the fiber optic cable 604, specifically the portion of the fiber optic cable 604 that includes a flexible conduit 618. In some embodiments, the two halves 622a, 622b can be substantially identical. Also, as shown, the halves 622a, 622b can be configured to accept a fan-out device 627.

The fan-out device 627 can include an end cap 640 and press-in sleeve 642. The end cap 640 can include a plurality of holes 641. The holes 641 can be sized to fit a plurality of furcation tubes 609. Additionally, the press-in sleeve 642 can include a plurality of protrusions 643. The press-in sleeve can be configured so that each protrusion 643 is sized to fit within each hole of the end cap 640.

To assemble the clamp 625, the optical fibers (not pictured) within the fiber optic cable 604 are first broken out. The fibers are then threaded through the press-in sleeve 642. After passing through the press-in sleeve 642, the fibers are threaded through the holes 641 of the end cap 640 and into the furcation tubes 609. Next, the furcation tubes 609 are passed through the holes 641 on the end cap 640. The press-in sleeve 642 is then pressed into the ends of the furcation tubes 609 and positioned so that each furcation tube 609 and each protrusion 643 of the press-in sleeve 642 are positioned in the holes 641 of the end cap 640 (see FIG. 34). The end cap 640 is then positioned between the two clamp halves 622a, 622b. Finally, the assembled clamp 625 is created by securing the two clamp halves 622a, 622b around the end cap 640 and the fiber optic cable 604, specifically the flexible conduit portion 618.

Figure 32:
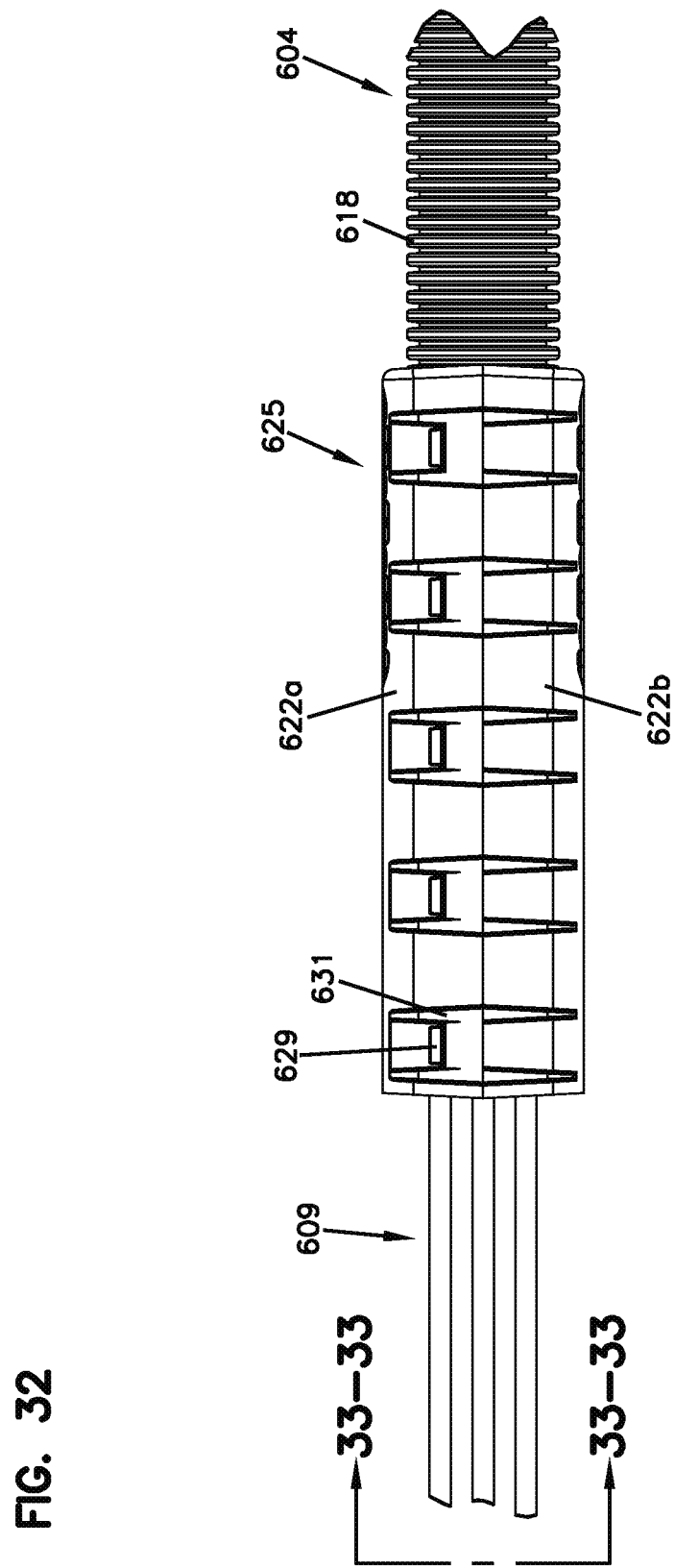
FIG. 32 illustrates a top view of the clamp shown in FIG. 30.

FIG. 32 is a top view of an assembled clamp 625. As shown, the clamp halves 622a, 622b can be adjacently positioned to one another so as to form the clamp 625. In some embodiments, the clamp halves 622a, 622b can each include a plurality of quick fasteners 629. In the depicted embodiment, the quick fasteners 629 are molded clips. In the view shown, the clips are integral with clamp half 622b. Clamp half 622a can include a plurality of receiving slots 631 configured to receive each clip from 622b. In some embodiments, the bottom view of the clamp 625 can be identical to the top view, except that the clamp half 622a has clips and the clamp half 622b has the receiving slots. The quick fasteners 629 are configured to allow the installer of the clamps to quickly secure the two clamp halves 622a, 622b to one another.

Figure 33:
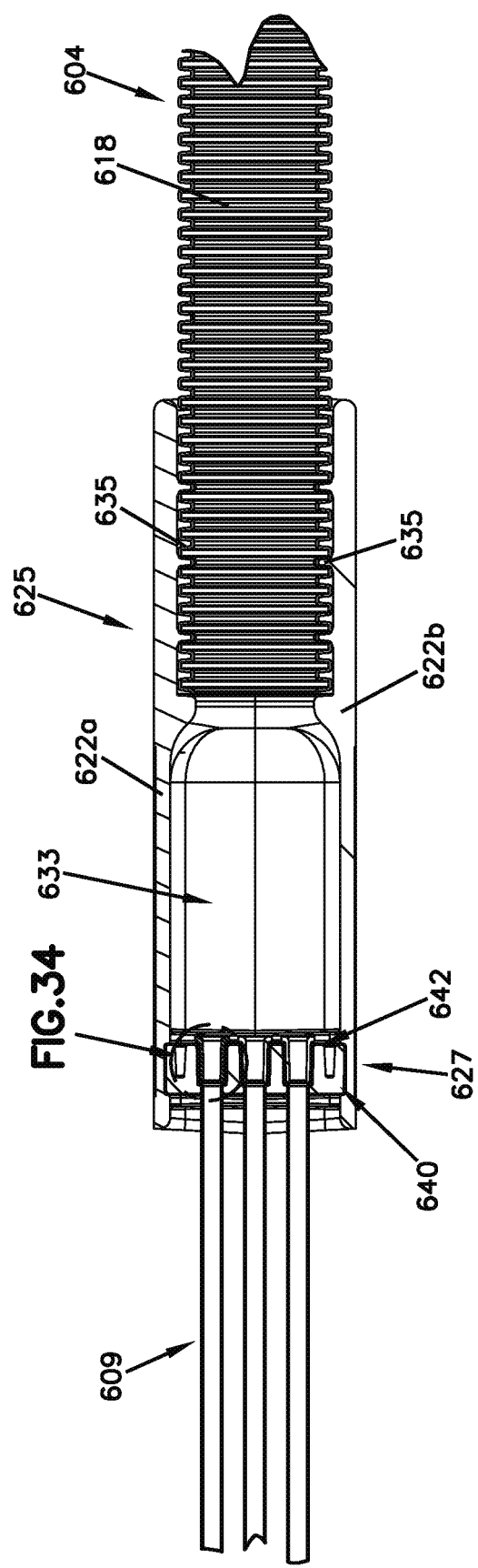
FIG. 33 illustrates a cross-sectional view along line 33-33 of the clamp shown in FIG. 32.

FIG. 33 is a cross-sectional view along line 33-33 of FIG. 32. As depicted, the fiber optic cable 604, specifically the flexible conduit portion 618, is partially enclosed by the two clamp halves 622a, 622b. Each clamp half 622a, 622b can include a plurality of ribs 635 that protrude from each clamp half. In some embodiments, the ribs 635 are configured to interface with the flexible conduit portion 618 of the fiber optic cable 604. The ribs 635 act to prevent axial movement of the flexible conduit 618 within the clamp 625.

The assembled clamp 625 also includes a pocket 633. The pocket 633 is configured to house optical fibers, or groups or optical fibers, as they protrude from the fiber optic cable 604. The pocket 633 is located in the clamp 625 in a space adjacent the fan-out device 627.

Figure 34:
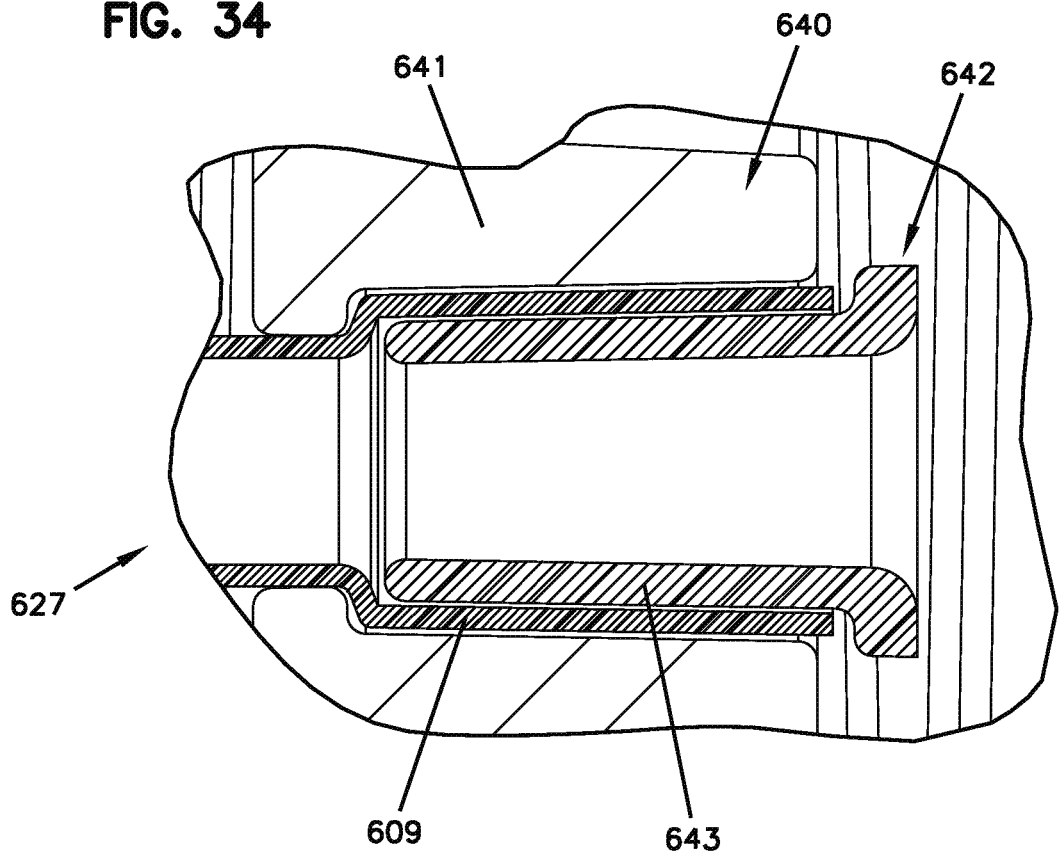
FIG. 34 illustrates an enlarged cross-sectional view of a portion of the clamp shown in FIG. 33.

FIG. 34 is a close-up view of a portion of the fan out device 627 of FIG. 33. As depicted, the press-in sleeve 642 is shown positioned within the end cap 640 of the fan-out device 627. Specifically, a single protrusion 643 of the press-in sleeve 642 is shown passing through a single hole 641 of the end cap 640. Further, a single furcation tube 609 is shown to be positioned over the protrusion 643 so that a portion of the furcation tube 609 surrounds the protrusion 643.

Figure 35:
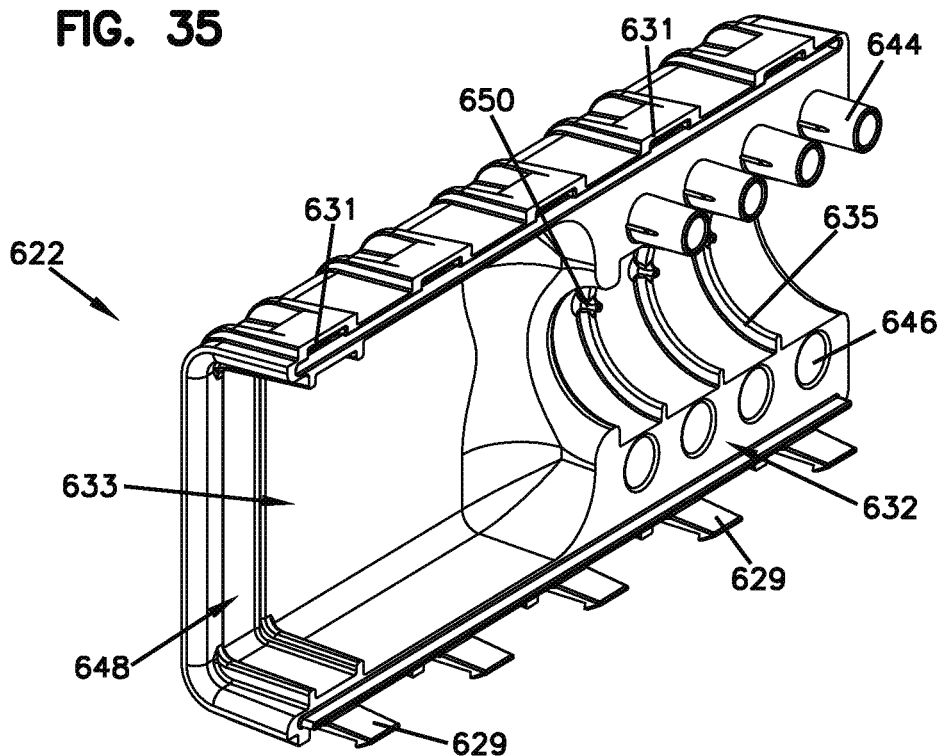
FIG. 35 illustrates a perspective view of a clamp half according to one embodiment of the present disclosure.

FIGS. 35-38 show a clamp half 622, according to one embodiment of the present disclosure. FIG. 35 is an isometric view of the clamp half 622. In the depicted embodiment, the clamp half 622 has a rear face 632 that includes a plurality of features configured to interface with the fiber optic cable (e.g. cable 604 in FIG. 30) and to secure the clamp half 622 with another identical clamp half. As mentioned above, the clamp half 622 includes receiving slots 631 and quick fasteners 629. The quick fasteners 629 are configured to be paired with receiving slots of another clamp half, and the receiving slots 631 of the clamp half 622 are configured to be paired with the quick fasteners of another clamp half. The clamp half 622 also includes a plurality of pegs 644 and a plurality of peg receiving holes 646. The pegs 644 and peg receiving holes 646 are configured to pair with corresponding pegs and peg receiving holes of another clamp half. The pegs and peg receiving holes help to align the clamp halves.

The rear face 632 also includes a plurality of ribs 635 and securing protrusions 650 both designed to interface with the fiber optic cable 604, specifically the flexible conduit portion 618. Adjacent the ribs 635 and securing protrusions 650 is the pocket 633 configured to house optical fibers. Additionally, the clamp half 622 can include an end cap receiving portion 648 configured to receive a portion of an end cap (e.g. end cap 640 in FIG. 31).

Figure 36:
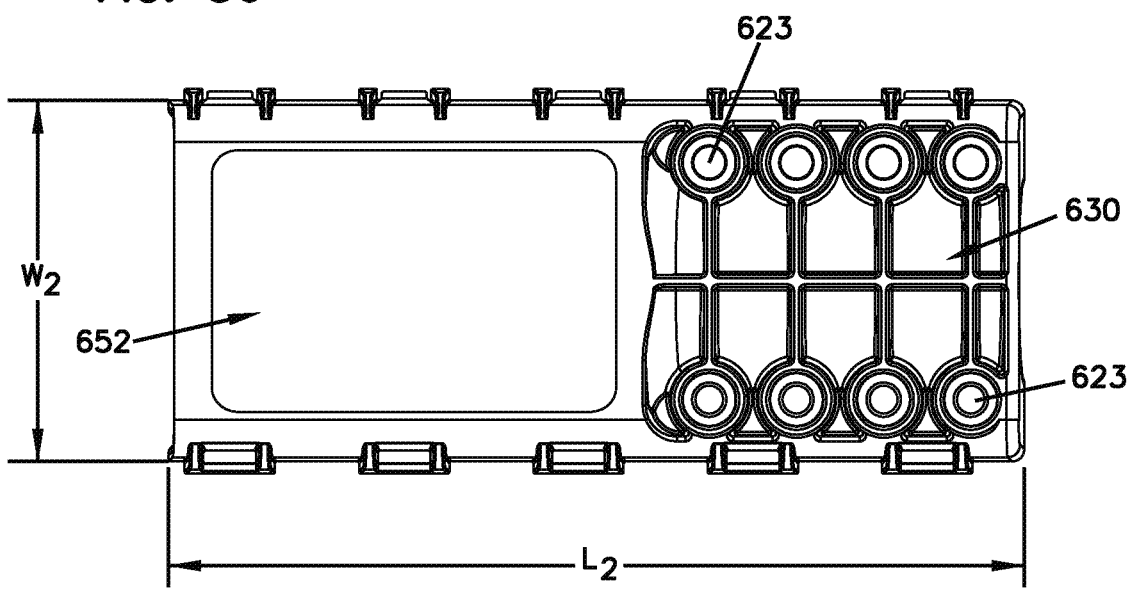
FIG. 36 illustrates a front view of the clamp half shown in FIG. 35.
Figure 37:
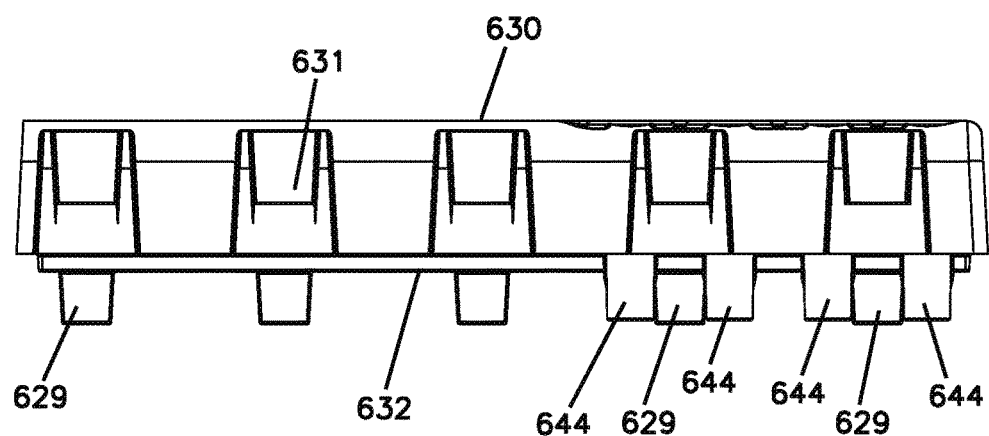
FIG. 37 illustrates a top view of the clamp half shown in FIG. 35.

FIG. 36 is a front view of the clamp half 622, and FIG. 37 is a top view of the clamp half 622. The clamp half 622 can have a length L2 and a width W2. In some embodiments, the length L2 can be between about 130.00 and about 140.00 millimeters. In other embodiments, the length L2 can be about 137.50 millimeters. In other embodiments, the width W2 can be between about 55.00 and about 65.00 millimeters. In other embodiments, the width W2 can be about 61.83 millimeters.

The clamp half 622 also includes a plurality of mounting holes 623 that pass through the clamp half 622 from a front face 630 to the rear face 632. The mounting holes may be spaced along the length L2 of the clamp half 622. In addition, the mounting holes 623 may be spaced along the width W2. In some embodiments, the mounting holes 623 have a stepped bore. The mounting holes 623 are configured to receive a plurality of fasteners (e.g. fasteners 626 in FIG. 27). In the depicted embodiment, the mounting holes 623 are configured to pass through the pegs 644 and peg receiving holes 646 on the rear face 632 of the clamp half 622, as shown in FIG. 35.

Still in other embodiments, the clamp half 622 may have a plurality of indentations 634 to help minimize the amount of material needed to manufacture the clamp half 622. In some embodiments, the clamp half 622 may be made from polycarbonate-ABS. Further, in the depicted embodiment, the front face 630 of the clamp half 622 includes a label portion 652 configured to receive an adhesive label or offer a generally smooth surface for writing on the clamp half 622.

Figure 38:
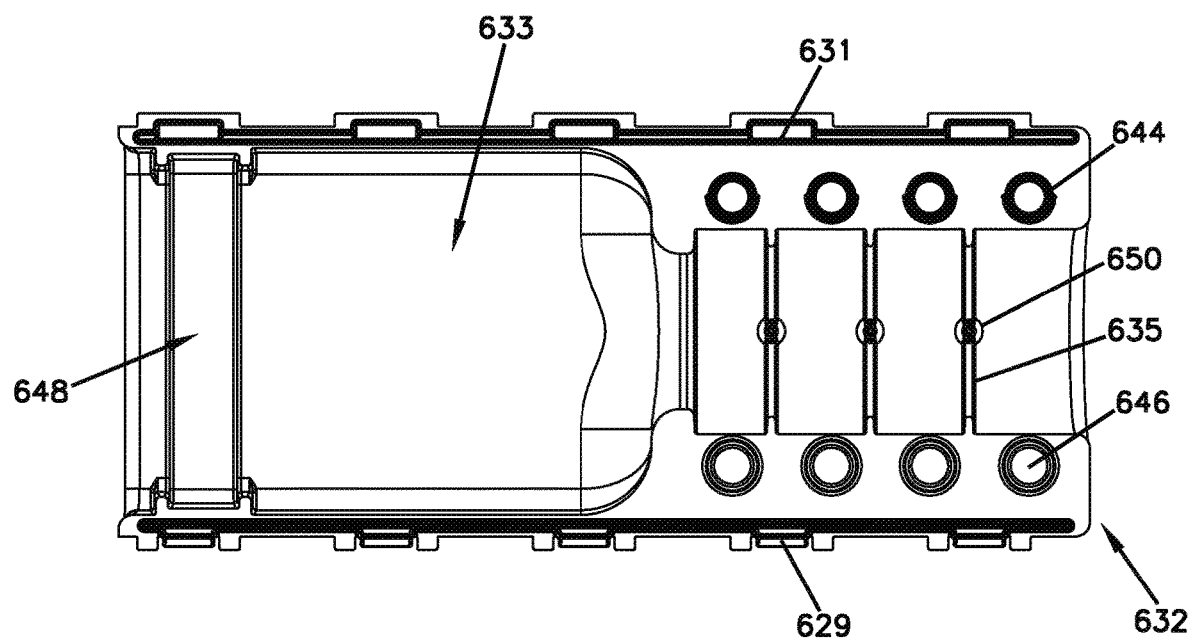
FIG. 38 illustrates a rear view of the clamp half shown in FIG. 35.

FIG. 38 shows a rear view of the clamp half 622. The rear face 632 of the clamp half 622 can at least partially have an end profile having an at least partially arcuate shape to accommodate the fiber optic cable. The arcuate shape of the portion of the rear face 632 can be configured to nest against a flexible conduit like 18, 118, 318, 418, or 618 mentioned above. The dimensions of both the rear face 632 arcuate profile and the overall clamp half 622 can be customized to fit a variety of different flexible conduit shapes. Like the embodiment outlined in FIGS. 16-25, the clamp half 622 may be sized for a 288F cable with a flexible conduit attached. In other embodiments, the clamp half 622 may be sized for a 576 cable with a flexible conduit attached. In still other embodiments, the clamp half may be sized for a 864F cable with a flexible conduit attached.

FIG. 38 also shows the rear face 632 including the plurality of securing protrusions 650 and ribs 635. In addition, the pocket 633 and end cap receiving portion 648 are positioned adjacent to the ribs 635 and securing protrusions 650. The securing protrusions 650 can be configured to be positioned within indentations, or grooves, of a flexible conduit like 18, 118, 318, 418 or 618 mentioned above. By being positioned in the indentations or grooves of the flexible conduit when mounted to the flexible conduit, the securing protrusions 650 and ribs 635 prevent the flexible conduit from moving in a direction along its central axis within the assembled clamp. In some embodiments, the securing protrusions 650 and ribs 635 also can assist in preventing the flexible conduit from rotating relative the assembled clamp. Such securing protrusions 650 and ribs 635 prevent the need to exert a high crushing force on the flexible conduit to prevent axial movement of the flexible conduit within the modular clamping system.

Figure 39:
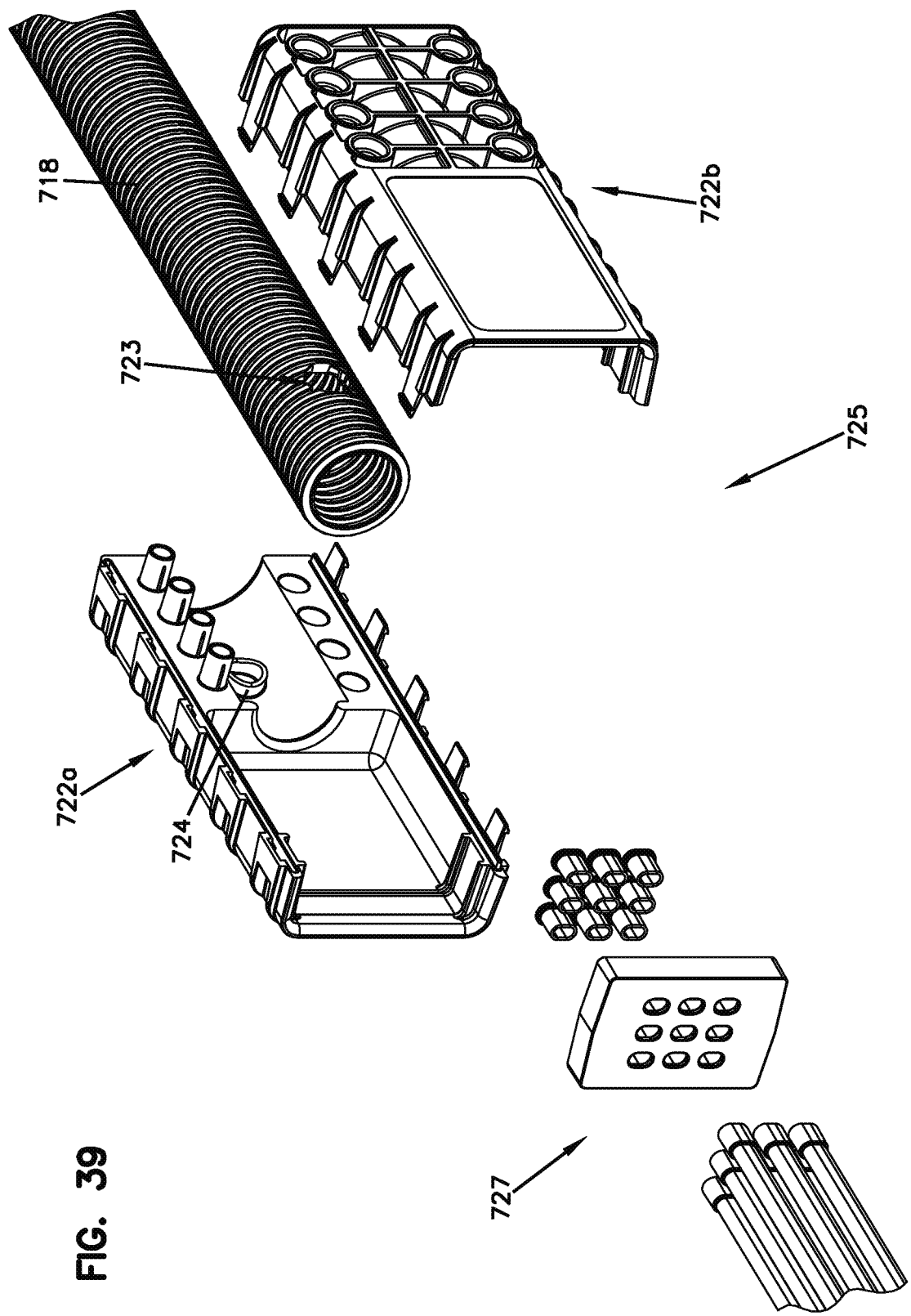
FIG. 39 illustrates a perspective view of a clamp half and flexible conduit portion according to one embodiment of the present disclosure.
Figure 40:
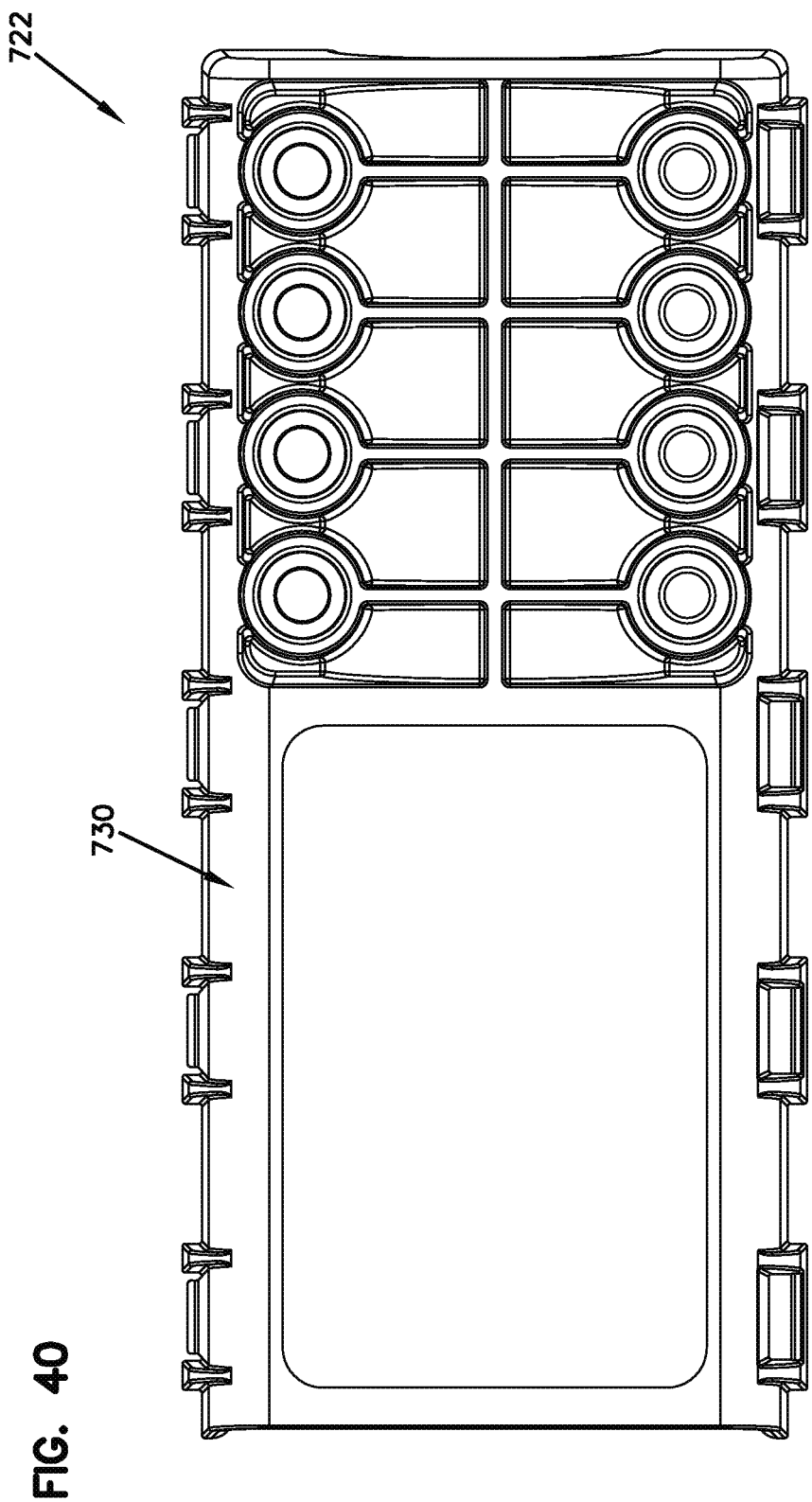
FIG. 40 illustrates a front view of the clamp half shown in FIG. 39.
Figure 41:
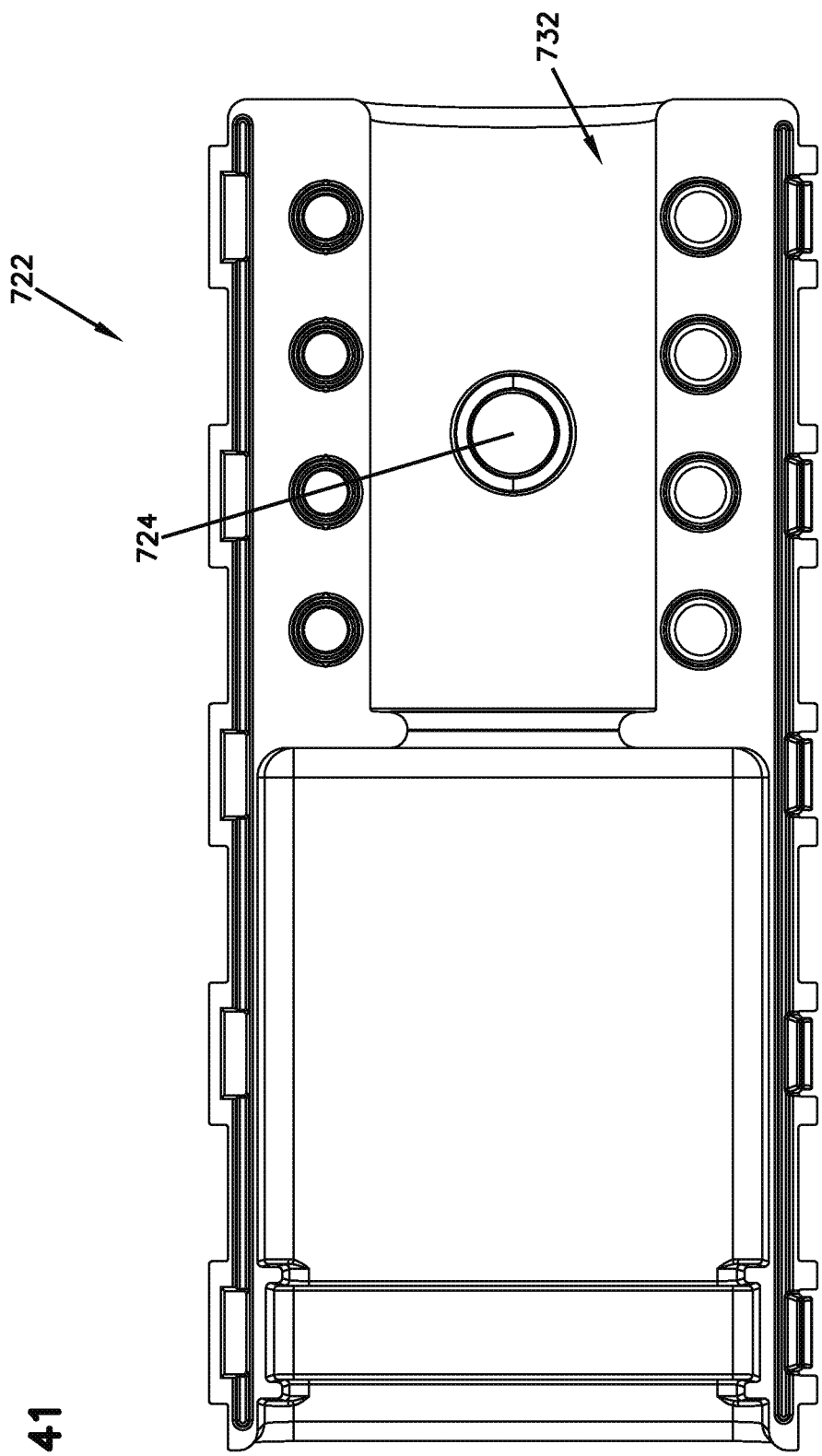
FIG. 41 illustrates a rear view of the clamp half shown in FIG. 39.
Figure 42:
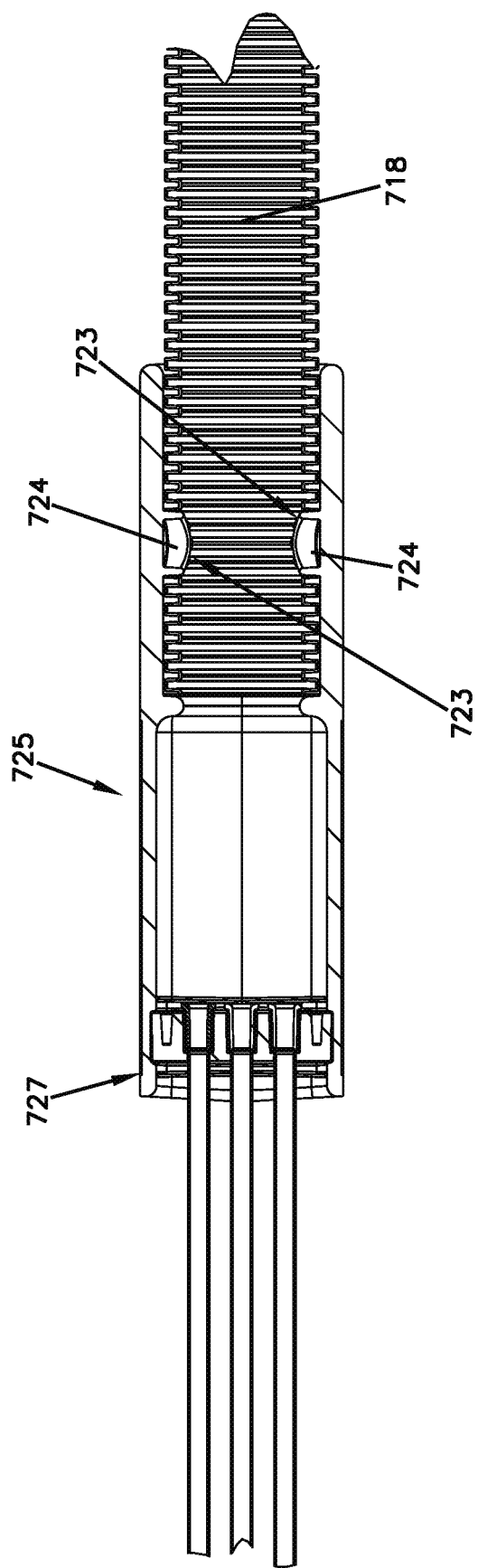
FIG. 42 illustrates a cross-sectional view of the clamp assembled shown in FIG. 39.

FIG. 39 shows two clamp halves 722a, 722b of a clamp 725 and a flexible conduit portion 718, according to one embodiment of the present disclosure. FIG. 40 shows the front face 730 of the clamp half 722, and FIG. 41 shows the rear face 732 of the clamp half 722. FIG. 43 is a top cross-sectional view of the assembled clamp 725. In the depicted embodiment, the clamp halves 722a, 722b are substantially identical.

The clamp half 722 is similar to the clamp half 622 shown in FIG. 35 and includes a fan-out portion 727. In the depicted embodiment, the flexible conduit portion 718 includes a securing feature 723. The securing feature 723 is configured to interface with the clamp halves 722a, 722b so that, once the clamp halves 722a, 722b are joined around the flexible conduit portion 718, the securing feature 723 prevents the flexible conduit portion 718 from rotating relative to the assembled clamp 725. As shown, the securing feature 723 is a pair of holes. In other embodiments, the securing feature 723 is an indentation, or indentations, in the flexible conduit portion 718. In still other embodiments, the securing feature 723 is an adhesive, or glue. In the depicted embodiment, the clamp half 722 includes a boss 724. The boss 724 of each clamp half 722 can be configured to interface with the securing feature of the flexible conduit portion 718. The boss 724 can be a protrusion from the rear face 732 of the clamp half 722. In the depicted embodiment, the boss 724 of each clamp half 722 is configured to be positioned within each securing feature 723, or hole, when the two clamp halves 722a, 722b are joined to form a complete clamp 725. Therefore, by being positioned within the securing feature 723, each boss 724 resists rotation of the clamp relative to the flexible conduit portion 718.

From the foregoing detailed description, it will be evident that modifications and variations can be made in the devices of the disclosure without departing from the spirit or scope of the invention.

What is claimed is:

1. A fiber optic cable comprising:
a plurality of internal optical fibers housed within furcation tubes; and
a flexible conduit portion, wherein the flexible conduit portion has a proximal end and a distal end, the distal end having a terminating device including a fan-out device, wherein the terminating device at least partially encases the flexible conduit portion, and wherein the plurality of optical fibers passes through the flexible conduit portion and the terminating device,
wherein the fiber optic cable includes a plurality of inner strength members disposed between an outer jacket and an inner conduit of a trunk cable portion secured to the flexible conduit portion.

2. The fiber optic cable of claim 1, wherein the flexible conduit portion surrounds a portion of the inner conduit.

3. The fiber optic cable of claim 1, wherein the proximal end of the flexible conduit portion is secured to the fiber optic cable using a heat shrink material.

4. The fiber optic cable of claim 1, wherein the proximal end of the flexible conduit portion is secured to the fiber optic cable using an overmold material.

5. The fiber optic cable of claim 1, wherein the proximal end of the flexible conduit portion is secured to the inner conduit using an epoxy, and wherein the flexible conduit portion is also secured to the outer jacket of the trunk cable portion_by a securing device.

6. The fiber optic cable of claim 5, wherein the securing device includes a heat shrink material.

7. The fiber optic cable of claim 5, wherein the securing device includes an overmold material.

8. The fiber optic cable of claim 5, wherein the inner conduit and outer jacket of the trunk cable portion terminate at the proximal end of the flexible conduit portion and wherein a portion the flexible conduit portion contains only the plurality of optical fibers disposed therein.

9. The fiber optic cable of claim 1, wherein the fan-out device includes a fan-out cap.

10. The fiber optic cable of claim 9, wherein the fan-out device is secured to the flexible conduit portion by the terminating device.

11. The fiber optic cable of claim 1, wherein the fan-out device includes an end cap defining a plurality of openings for receiving the furcation tubes.

12. The fiber optic cable of claim 11, wherein the terminating device includes a plurality of press-in sleeves received in the plurality of openings.

13. The fiber optic cable of claim 1, wherein the terminating device includes a clamp including a first clamp half and a second clamp half.

14. The fiber optic cable of claim 13, wherein the first clamp half and the second clamp half are each provided with integral quick fasteners such that the first and second clamp halves can be secured together without the use of separate fasteners.

15. The fiber optic cable of claim 13, wherein the clamp receives and secures the flexible conduit portion and the furcation tubes.

16. The fiber optic cable of claim 15, wherein the fan-out device includes an end cap secured within the clamp.

17. A fiber optic cable comprising:
a plurality of internal optical fibers housed within furcation tubes; and
a flexible conduit portion, wherein the flexible conduit portion has a proximal end and a distal end, the distal end having a terminating device including a fan-out device, wherein the terminating device at least partially encases the flexible conduit portion, and wherein the plurality of optical fibers passes through the flexible conduit portion and the terminating device,
telecommunications equipment including a termination location, wherein the telecommunications equipment is configured to receive the distal end of the flexible conduit portion, and wherein the plurality of optical fibers are configured to connect to the termination location in the telecommunications equipment;
wherein the flexible conduit portion is bent relative to an axis of the fiber optic cable, wherein an outer jacket and an inner conduit of a trunk cable portion terminate so as to allow only optical fibers to extend through a portion of the flexible conduit portion to the terminating device.

18. A fiber optic cable comprising:
a plurality of internal optical fibers housed within furcation tubes; and
a flexible conduit portion, wherein the flexible conduit portion has a proximal end and a distal end, the distal end having a terminating device including a fan-out device defining a plurality of openings for separating at least some of the furcation tubes, wherein the terminating device at least partially encases the flexible conduit portion, and wherein the plurality of optical fibers passes through and beyond the flexible conduit portion and the terminating device, wherein the fan-out device includes an end cap defining the plurality of openings;
wherein the terminating device includes a body receiving the end cap, and wherein the distal end of the flexible conduit portion is received into the body.

* * * * *